United States Patent [19]

Hamada et al.

[11] Patent Number: 5,020,169

[45] Date of Patent: Jun. 4, 1991

[54] ELEVATION BED

[75] Inventors: Takeaki Hamada; Kiyoshi Abe; Hitoshi Takei; Kenji Sato, all of Tokyo, Japan

[73] Assignee: Sanwa Shutter Corporation, Tokyo, Japan

[21] Appl. No.: 231,762

[22] Filed: Aug. 12, 1988

[30] Foreign Application Priority Data

| Aug. 13, 1987 | [JP] | Japan | 62-124296 |
| Aug. 13, 1987 | [JP] | Japan | 62-124297 |
| Aug. 13, 1987 | [JP] | Japan | 62-124298 |
| Aug. 19, 1987 | [JP] | Japan | 62-126204 |
| Nov. 19, 1987 | [JP] | Japan | 62-176639 |
| Nov. 19, 1987 | [JP] | Japan | 62-176640 |
| Mar. 18, 1988 | [JP] | Japan | 63-36238 |

[51] Int. Cl.$^5$ .............................. A47C 19/00
[52] U.S. Cl. .............................. 5/10.2; 5/11
[58] Field of Search .............. 5/11, 10 R, 10 B, 63, 5/64, 65, 83, 88; 312/246, 247; 108/149

[56] References Cited

U.S. PATENT DOCUMENTS

| 593,445 | 11/1897 | Toal et al. | 5/10 B |
| 3,665,527 | 5/1972 | Gonzalez | 5/10 B |
| 4,837,877 | 6/1989 | Hamada et al. | 5/11 |

FOREIGN PATENT DOCUMENTS 911046 11/1962 United Kingdom .
2140386 11/1984 United Kingdom .

Primary Examiner—Alexander Grosz
Attorney, Agent, or Firm—Ladas & Parry

[57] ABSTRACT

This invention discloses an electrically driven elevation bed apparatus which moves up and down while keeping its horizontal posture, in order to make effective use of indoor space. The elevation bed of this invention includes improved driving systems and safety devices for the driving systems. The driving systems includes a driving device including a spring to store biasing force on a supporting shaft thereof for the ascending of the bed frame. Also included is the use of steel belts as cord bodies to hand the bed frame to make the driving device compact and to eliminate troubles encountered with wireropes. The third aspect of the present invention also relates to an improvement of the driving systems. This aspect enables the bed frame to be positioned in inclined postures by introducing clutch means in the driving device to raise one side of the bed only. To the elevation bed, various safety devices are provided for movement of the furniture. They are a detecting device to detect the loss of tension or breakage of cord bodies, a disengagement preventing device to secure the engagement of the bed frame and guide rails, a protecting device using a guard net to prevent the user from falling from the bed and cushioning device to improve the starting motion of the bed frame by eliminating shock and by enabling the driving device to be more effective and safer in its operation. The present invention includes systems which can be combined and the various safety devices are available to be adopted correspondingly and combined freely.

12 Claims, 22 Drawing Sheets

FIG. 25
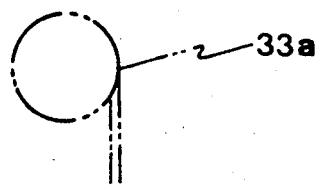
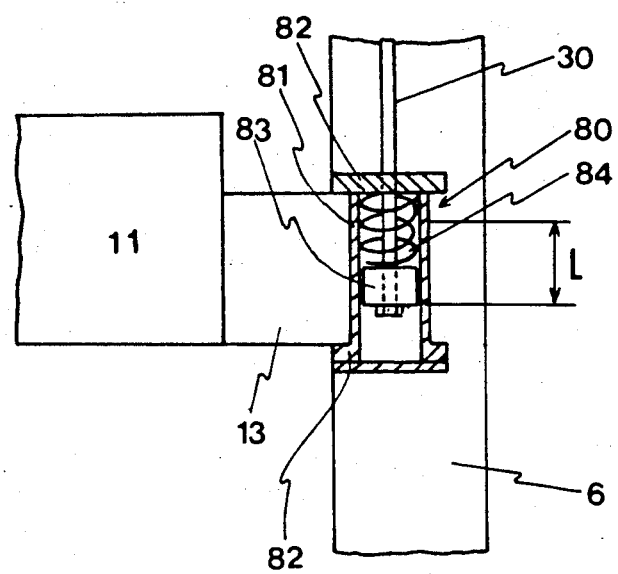
FIG. 26
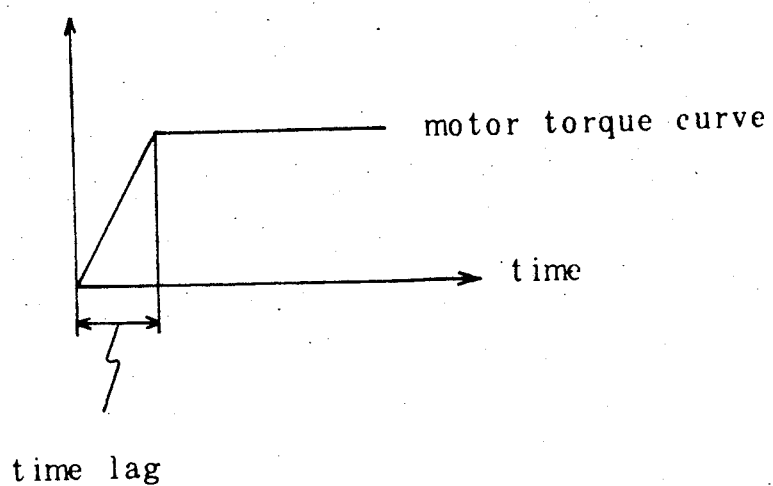

ELEVATION BED

BACKGROUND OF THE INVENTION

1. Field of the Invention

This invention relates to a bed for use in a small room where space is at a premium. More particularly, the invention relates to an elevation bed which, when not in use, can be raised so that the floor space can be effectively used for other purposes. The invention also relates to the driving mechanism and safety features of such a bed.

2. Description of the Prior Art

A fact of modern life is that there is becoming a scarcity of living space, particularly in large cities. The demand for housing has caused the housing expense of an individual to continually soar. With this increase in population density, the number of single dwellers is increasing, and the demand for one room apartments is likewise increasing. A bed occupies a large portion of the space of such small dwellings However, since a bed is needed only for nighttime sleeping hours, the floor space occupied by the bed can be said to be utilized very inefficiently. Beds are known which have been constructed to solve this problem One example is a bed that is stored by raising one end of the bed with the other end hinged on a wall or another piece of furniture. This saves space by storing the bed in a vertical position. With such a bed design, however, it is very cumbersome to lift the bed into the stored position and pull it down out of the stored position. Moreover, when the bed is attached to other furniture, relocating the furniture necessarily requires relocation of the bed. In addition, the mattress and bed clothes must be bound or stored separately or they fall off of the bed when it is raised to the stored position.

Elevation beds, capable of moving vertically with the mattress maintaining its horizontal position have been suggested. The early types have been operated manually, imposing on the user heavy daily labor. A more recent electrically operated elevation bed has a driving device, thus eliminating the labor needed to store and unstore the bed. However, such beds do not have sufficient safety features.

The present invention eliminates the problems of the prior art described above. An object of the present invention is to improve the driving mechanism of the elevation bed.

A second object of the present invention lies in the improvement of the driving mechanism for moving the bed up and down.

A third object of the invention lies in the improvement of the driving mechanism so as to permit the user to be able to recline on the bed in an incline posture.

BRIEF SUMMARY OF THE INVENTION

The present invention offers improvements over the prior art in three basic areas consistent with the above-described objects of the invention.

In order to improve the driving mechanism of the elevation bed, guide rails are provided on a structural frame, and movement of the bed frame is caused by the winding and unwinding of flexible cords driven by a driving device. A coil spring is employed to store an upwardly biasing force as the bed frame descends. The stored biasing force then assists in the raising of the bed frame. The coil spring may be provided on a supporting shaft on which drums to wind the flexible cords are also supported.

A second improvement over the art lies in the arrangement of winding the flexible cords in layers on the drum, such cords being manufactured in the form of flat steel belts. That is, the steel belts are wound upon themselves to form additional layers for each revolution of the drum. In this embodiment of the invention, the total size and volume of the driving device assembly are considerably reduced, and the layered belt arrangement results in the automatic adjustment of the rate of movement of the bed frame. That is, when the bed frame is in its lowest position, the speed of movement of the bed frame is less due to the fact that fewer layers of steel belts are wound around the drum, and, at the same time, the smaller diameter of the wound belts results in a reduction of the power needed by the motor.

The third feature of the invention concerns the ability of the elevation bed to incline the bed frame to some degree so as to permit the user to be able to recline in an inclined posture for book reading, enjoying television, meeting special needs of elderly users, and for assisting a person to recover from foot fatigue by raising the foot side of the bed.

The driving device is preferably installed on an upper part of the bed structure and supported on a wall, thereby occupying less room space while at the same time reducing the weight of the bed frame relative to that which was used by the prior art to house the driving device.

Various safety features of the elevation bed are also described herein, and include a detecting device for detecting the unexpected loss of tension or breakage of the flexible cords. Such detecting device is coupled to the flexible cords and reacts with preventative measures in response to sudden movement or falling of the bed frame.

Another safety device prevents the bed from disengaging from the supporting guide rails. This device includes engaging members biased to protrude into the guide rails to keep the frame in contact with the guide rails whenever the bed frame swings horizontally.

Another safety device is disclosed which protects the user from falling off the bed. This device is installed between the side of the bed frame and the ceiling and includes a guard net storable on a winding device. The winding device keeps the guard net always in tension by biasing the net independent of the height of the bed frame.

A further safety device is disclosed for cushioning the movement of the bed frame during start up of the ascending motion. These devices are installed between the ends of the flexible cords and the bed frame, eliminating the shock experienced at the start up motion of the bed frame assembly.

In the present invention, the construction of the bed frame is reinforced by means of side frame boards attached to the frame. The side frame boards are made of plastic and formed of hollow sections, the hollow parts being filled with core material where they are attached to the bed frame so as to provide a more rigid construction for the bed frame.

The driving device preferably includes drums for winding the flexible cords to raise both the head side and the foot side of the bed frame separately. The driving device includes a motor, at least one drum, and a clutch adapted to engage and disengage transmission of the driving power. By these means, if the head side or foot side is raised by the driving device, and the clutch is released from the other side, the bed frame will attain a longitudinally inclined posture.

Other characteristics of the present invention will be better understood from the following description referring to the attached drawings which show non-limiting embodiments.

BRIEF DESCRIPTION OF THE DRAWINGS

FIG. 2 is a perspective view of the first embodiment of the present invention;

FIG. 3 is a front view of the driving device of the first embodiment;

FIG. 4 is a perspective view of another embodiment of the invention, housing the driving device in the bed frame;

FIG. 5 is a perspective view of the second embodiment of the invention;

FIG. 6 is a front elevation view of the second embodiment of the invention;

FIG. 7 is a front view of the driving device for the second embodiment of the invention;

FIGS. 8 and 9 are a front view and a cross-sectional view, respectively, of a winding drum;

FIGS. 10 and 11 are a front view and a side view, respectively, of a drum wound with belts to illustrate a safety feature of the present invention;

FIG. 12 is a plan view of the third embodiment;

FIG. 13 is a side view of the third embodiment;

FIG. 14 is an electrical circuit diagram for the driving device;

FIGS. 15 and 16 are a front and a side view, respectively, of a safety device;

FIGS. 17 and 18 are plan views illustrating operation of the safety device of FIGS. 15 and 16;

FIG. 19 is a side view of another safety device;

FIG. 20 is a horizontal section to illustrate a prior art bed frame-to-guide rail engaging device;

FIG. 21 is a perspective view of the overall structure of the protective device;

FIG. 22 is a vertical sectional view of the protective device;

FIG. 23 is a perspective exploded view of the protective device;

FIGS. 24-28 show a cushioning device, representing a further safety feature of the present invention;

FIG. 24 is an overall elevation view of the cushioning safety device;

FIG. 25 shows details of the safety cushioning device;

FIG. 26 is a graph to illustrate motor torque using the safety feature of FIGS. 24-28;

FIG. 27 shows the details of a stopper for the bed frame;

FIG. 28 shows a side view of another embodiment of the cushioning;

DETAILED DESCRIPTION OF THE PREFERRED EMBODIMENTS

The construction of the elevation bed according to the present invention will now be described in detail with reference to the preferred embodiments shown in the accompanying drawings.

Figure 1:
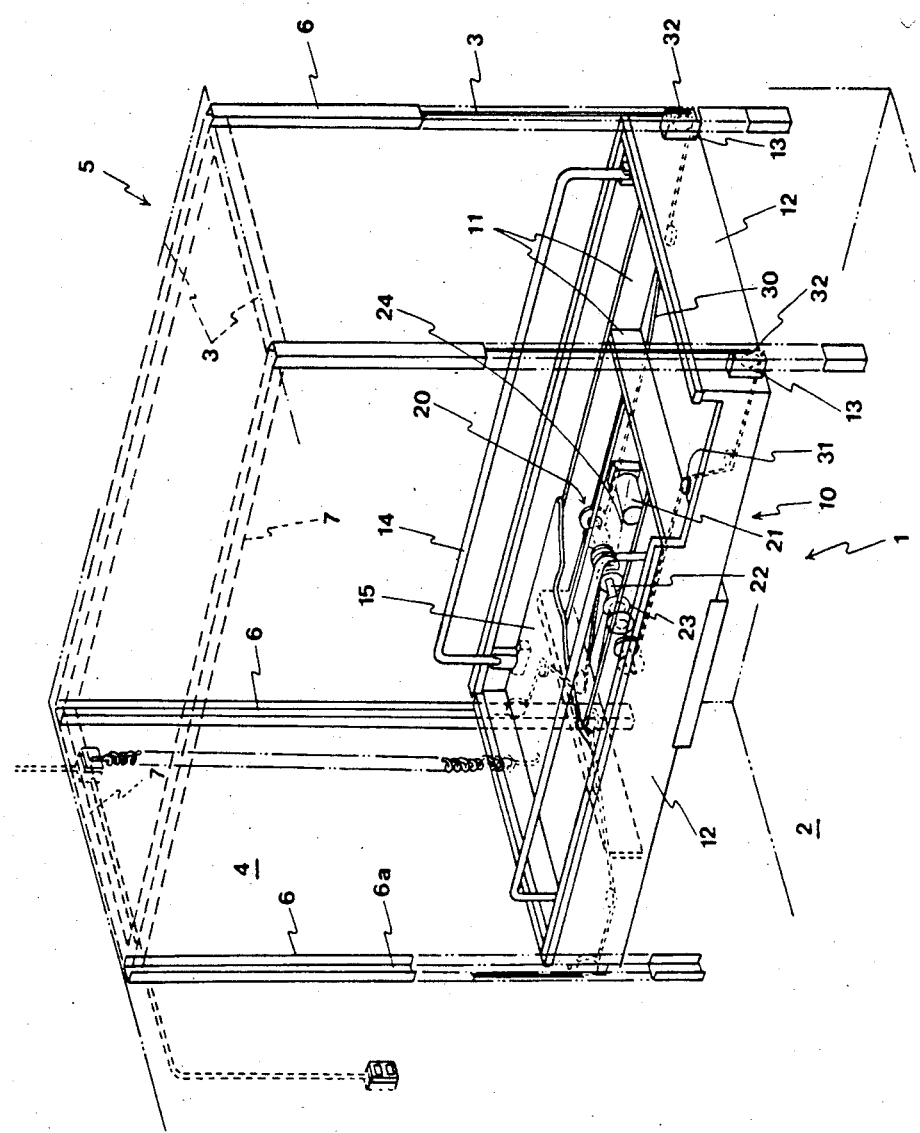
FIG. 1 is a perspective view illustrating the overall construction of a prior art conventional elevation bed.

FIG. 1 is a perspective view illustrating the overall construction of a conventional prior art elevation bed 1 mounted with respect to the floor 2, the ceiling 3, and a wall 4. A structural framework, referred to herein as main body 5, consists of four vertical columns 6 with horizontally extending portions permitting the columns 6 to function as guide rails. The beams 7, shown in FIG. 1 in dotted lines, connect to the top of the columns and are essential elements when the bed stands in a room independently of the wall and ceiling mounts.

A bed frame 10 is another major part of the elevation bed 1. Bed frame 10 consists of a lower frame member 11, side boards 12 vertically oriented and fixed about the frame members 11, and engaging members 13. The engaging member 13 consists of a square tube at the end of each frame member 11 essentially extending frame member 11 longitudinally. The cross-section of the engaging member 13 is smaller than that of the frame member 11 so as to be able to fit into a groove 6a of a column 6 and be slidably engageable therewith. A sheave 32 is positioned in engaging member 13 to function as a pulley for a wire rope 30.

A hand rail 14 is installed on top of the side board 12 of bed frame 10, and a bottom member 15 is made of wood, or alternatively, comprises boards (slats), or springs extending between frame members 11 as is conventional in bed frame supports for mattresses.

Frame member 11 is made of metal and, as seen in FIG. 1, comprises a rectangular box-like structure defining the periphery of the bed frame 10, as well as inner beam members extending from side to side of the bed frame 10.

A driving device 20 is mounted inside bed frame 10 for effecting vertical movement of the bed frame 10. Driving device 20 comprises an electric motor 21, a support shaft 22, a plurality of drums 23 fixed on the shaft 22, and an endless belt 24 which couples the power delivered by the motor 21 to the rotatable shaft 22. One end of wire rope 30 is fixedly attached to the upper end of guide rail 6, and from there it runs through a plurality of sheaves, one sheave 32 being positioned inside of the tubular engaging member 13, and a series of sheaves 31 guiding the wire rope through the bed frame 10, and finally about the periphery of drum 23. A pair of drums and corresponding wire ropes 30 and sheaves 32 are shown on the left and right sides of the bed 1 in FIG. 1. Accordingly, wire ropes 30 are wound and unwound around drums 23 by the rotation of the drums and move the bed frame 10 and its accessory parts vertically along the guide rails 6. The general construction and arrangement just described are relatively well known in the field.

The fundamental construction of an elevation bed 1 according to the present invention will now be described with reference to FIG. 2. Where appropriate, the same reference numerals will be used for common parts in the various embodiments of the invention and correspond to those already described with respect to the prior art.

Figure 2:
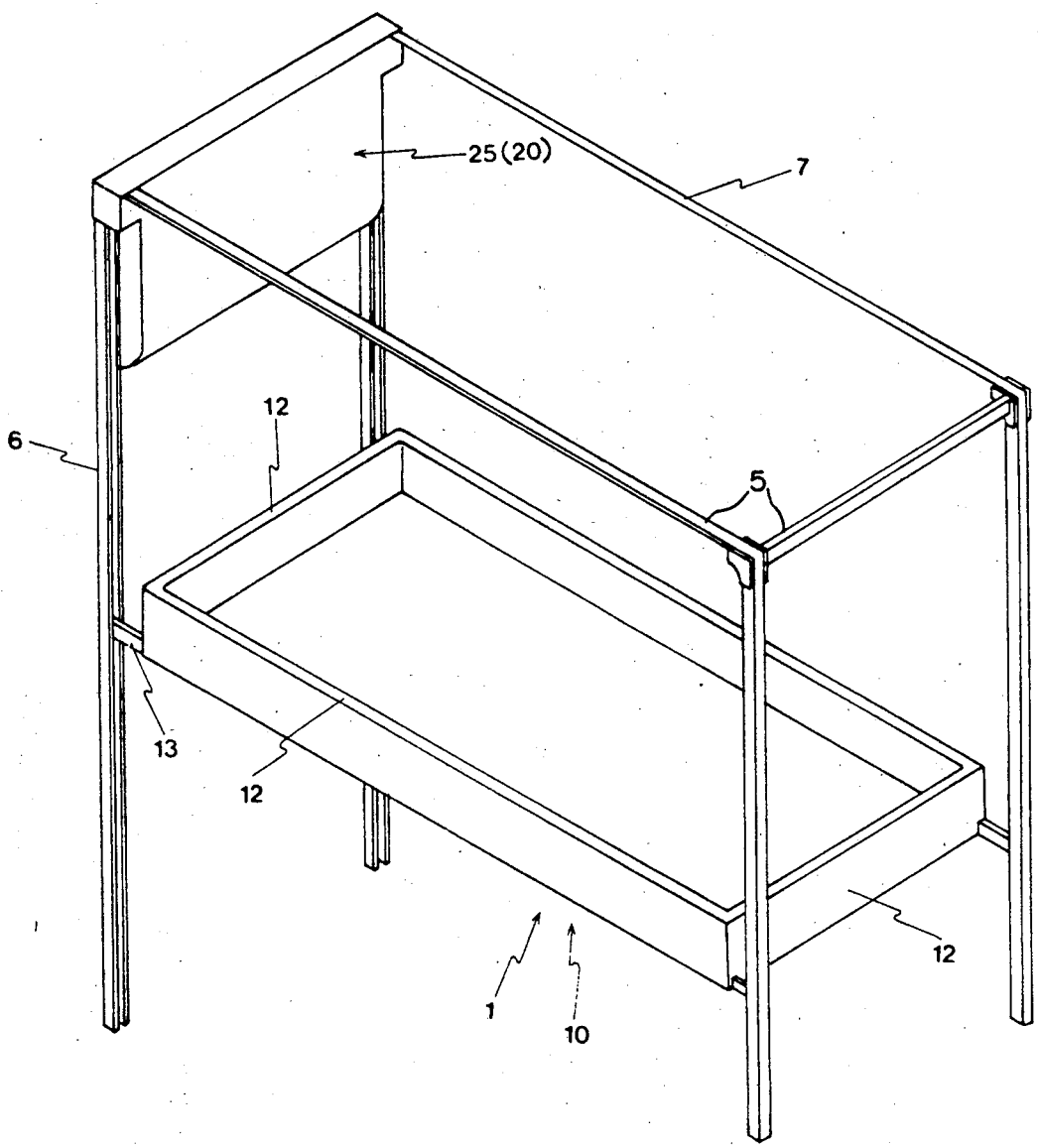
FIGS. 2-4 illustrate one embodiment of the present invention.
Figure 3:
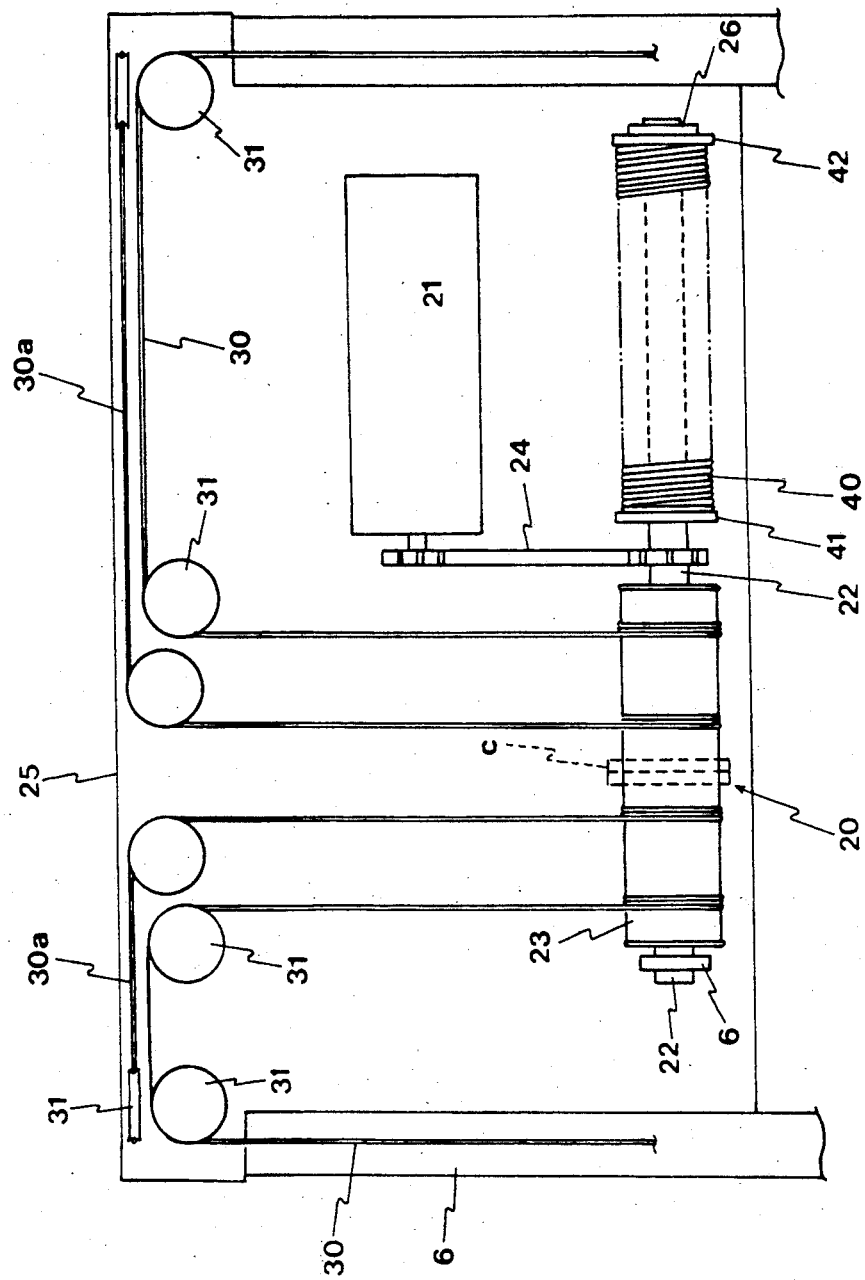

As shown in FIG. 2, the elevation bed 1 is constructed with four vertical columns 6 and a pair of connecting beams 7. When the beams 7 are to be supported on a wall, the columns 6 support a casing 25 containing the driving device 20 (not seen in FIG. 2). The inner arrangement of the driving device is shown in FIG. 3 where it can be seen that some of the wire rope 30 running to opposite columns 6 of the elevation bed 1 are indicated by wire rope portions 30a running through beams 7. That is, wire ropes 30 run across sheaves 31 and down the column that is supporting the casing 25, while the other wire ropes 30a run about horizontally disposed sheaves 31 and through the hollow portions of beam 7.

In the present invention, the rotating supporting shaft 22 is supported on and between brackets 26. On a part of the rotating shaft 22, a coil spring 40 is provided One end of spring 40 is fixed on the shaft by means of a disk 41, and the other end is supported for rotation about the shaft 22 by means of a disk 42. Accordingly, when the winding drum 23 rotates to deliver wire rope 30 (i.e., during lowering of the bed frame), the spring 40 is tensioned as the bed frame 10 descends to thereby store a rotational force in spring 40. When the drum 23 rotates in the opposite direction to draw wire ropes 30 into casing 25 and around drum 23, the bed frame 10 ascends assisted by the bias of springs 40, thereby reducing the load on the motor 21 in the ascending operational mode of the bed.

According to the invention, the weight of casing 25 containing driving device 20 can be supported on a wall, and the beams 7 may also be fixed thereon. This produces two advantages; it is possible to not only reduce the load of the motor 21 which, in the prior art, is installed in the bed frame 10, but the supporting columns 6 and beams 7 can be of lightweight construction because the weight of the driving device is not supported by these members.

Moreover, the volume of casing 25 can be reduced, relative to the prior art arrangement, thereby providing a more effective utilization of the overhead space of bed frame 10.

Figure 4:
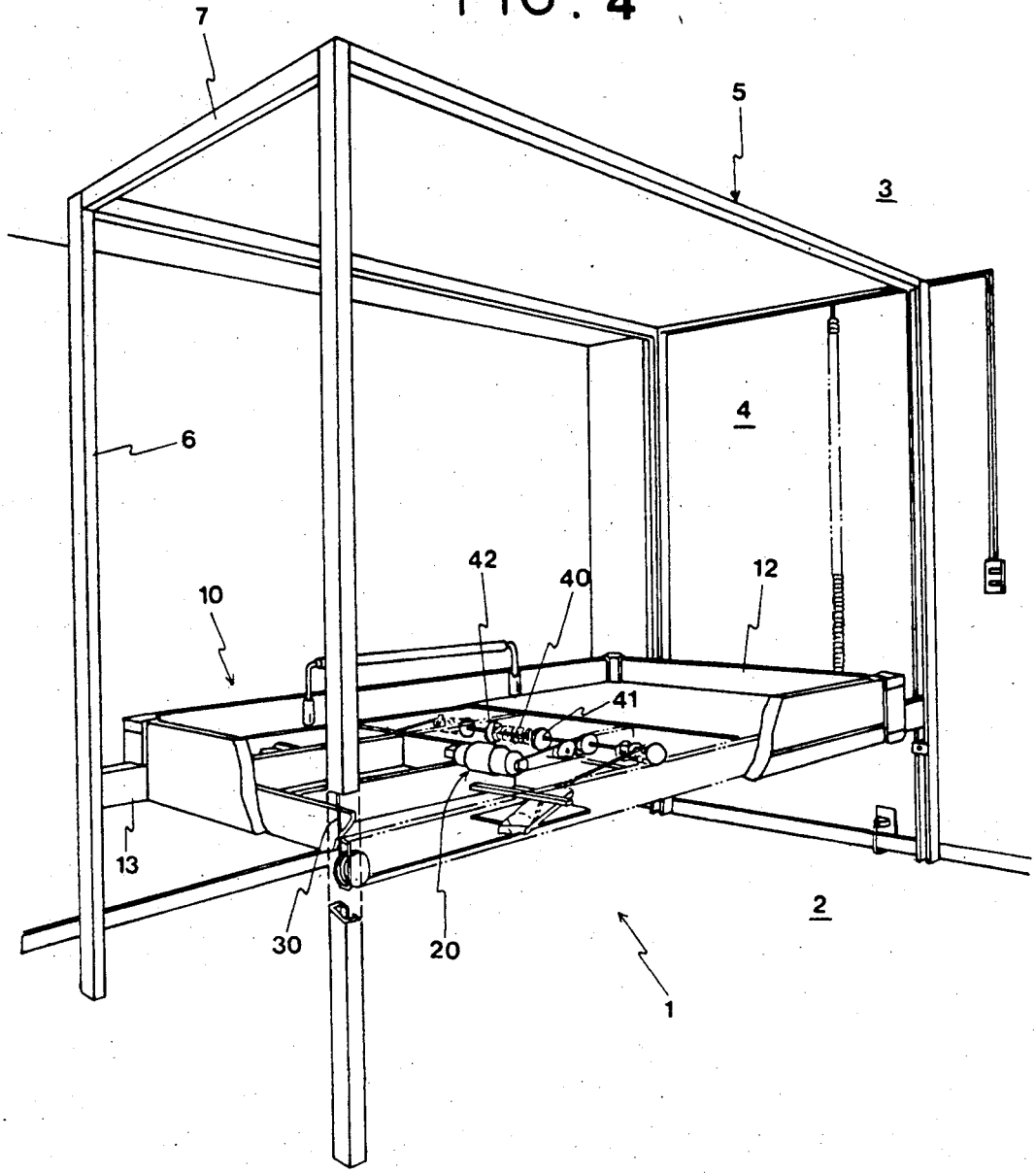

The elevation bed shown in FIG. 4 is an example of a self supporting unit, i.e., the elevation bed is installed in a room independent of any wall. In this embodiment, the driving device 20 is disposed inside the bed frame 10, as in the prior art. However, the driving device 20 differs from the prior art shown in FIG. 1, in that it includes a coil spring 40 on the supporting shaft 22 to assist in the ascending of the bed frame 10, in the manner described with respect to the arrangement of FIG. 3.

FIGS. 5 through 11 illustrate an elevation bed 1 having additional features which realize other objects of the present invention. In an elevation bed of the prior art, the wire ropes wound on the winding drum tend to be damaged by bending while wound in layers thereon, and in the worst case, the wire ropes yield to excessive fatigue and break. There is the additional disadvantage of requiring intermediate transit sheaves to guide the wire ropes in multiple directions through the bed frame and supporting structures as can be seen in FIG. 1.

Figure 5:
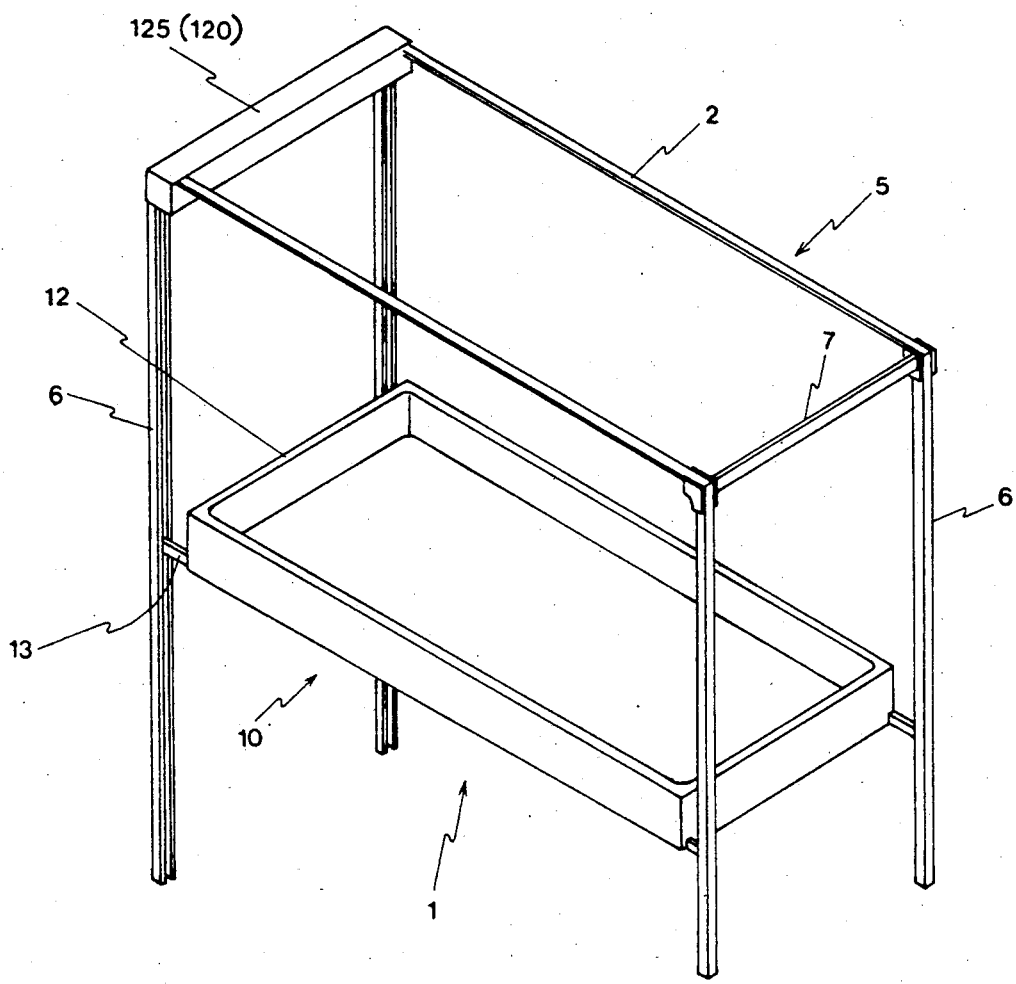
FIGS. 5-11 illustrate a second embodiment of the present invention.
Figure 6:
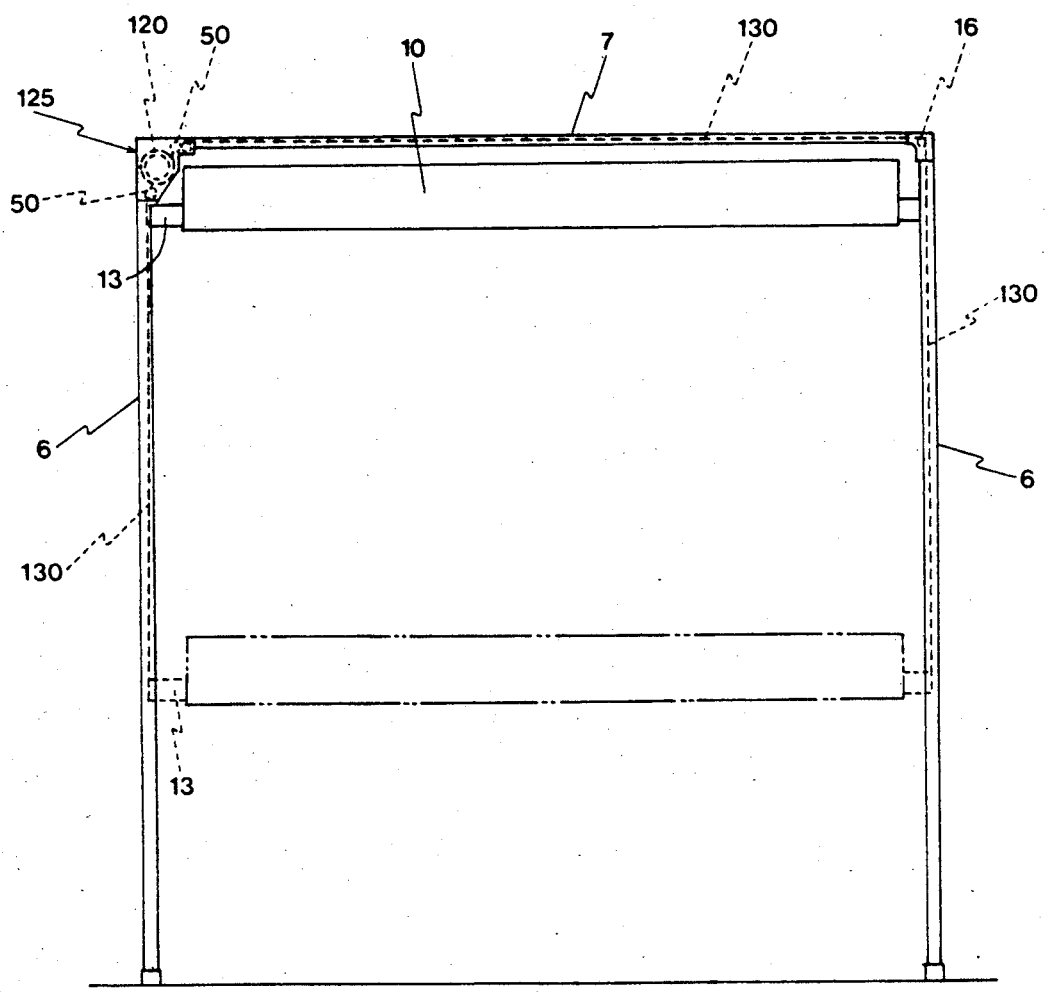

In the embodiment of the invention shown in FIGS. 5 and 6, reference numerals over 100 are given for parts of the elevation bed that differ from the preceding constructions. The casing 125 is support on the top of beams 7 of the structure 5, and the driving device 120 is contained therein and differs from the driving device 20 described earlier.

Figure 7:
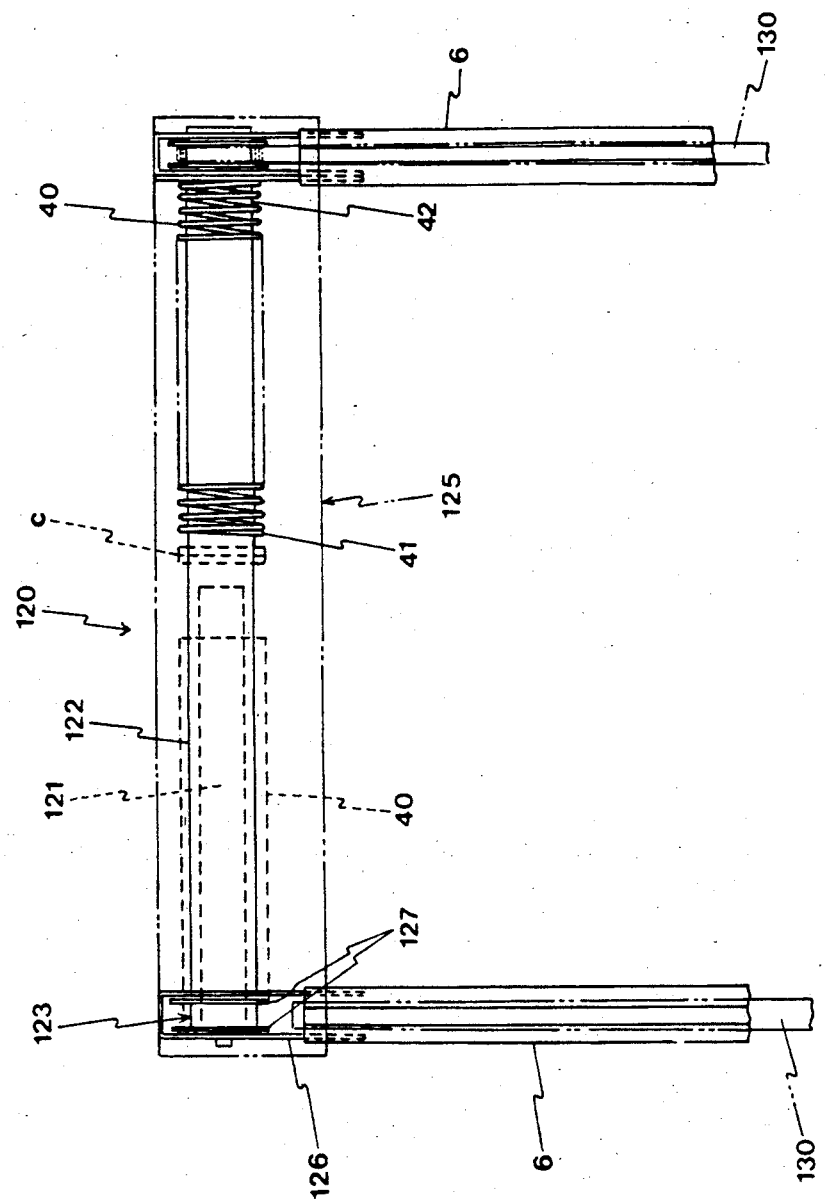
Figure 8:
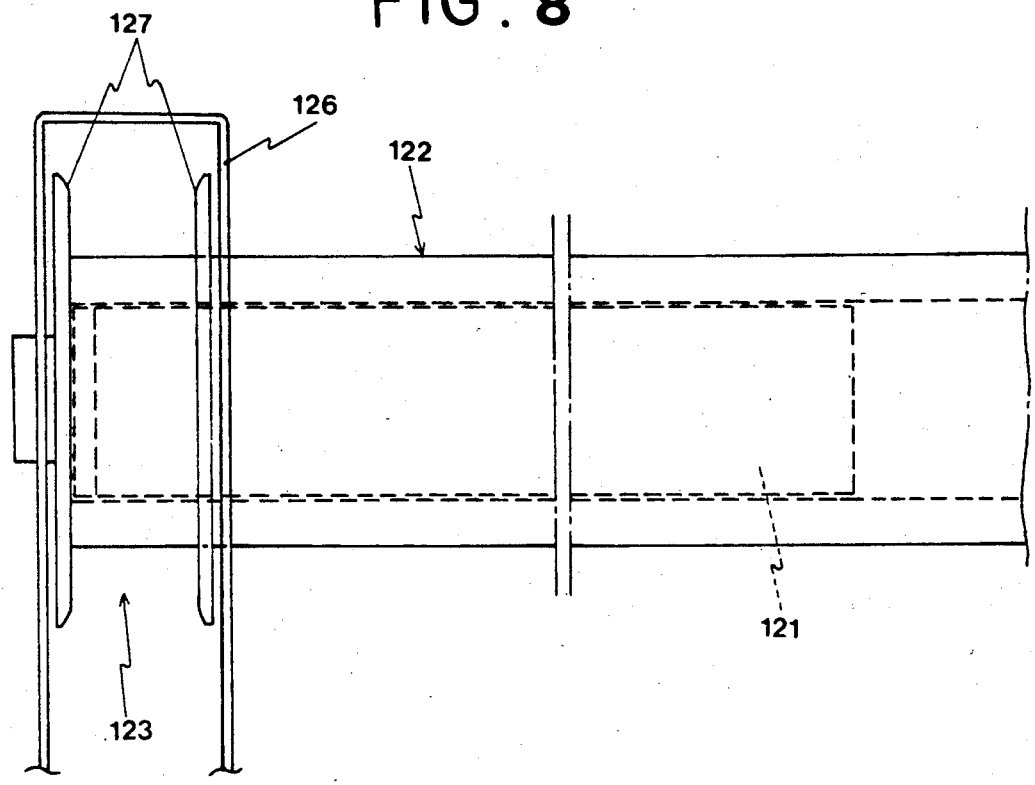

In the casing 125, as shown in FIG. 7, the shaft 122 of hollow cylindrical configuration is rotatably supported in brackets 126 fixed to the top of column guide rails 6. An electric motor 121, mounted on one of the brackets 126 inside the hollow of shaft 122, rotates the shaft 122 in both directions to wind and unwind, respectively, the flat cord (belt) 130 on winding drums 123. Each winding drum 123 has a pair of flanges 127, better seen in FIG. 8, spaced a predetermined distance apart to form a flanged winding drum 123. The belt 130 is adapted to be wound around drum 123 between flanges 127. In comparison with FIG. 3, since the motor 121 is contained in the hollow part of shaft 122, no endless belt means 24 (FIG. 1) is needed to deliver the power of the motor 121 to the rotating shaft 122, thereby making the volume of the casing 125 small and compact.

Figure 9:
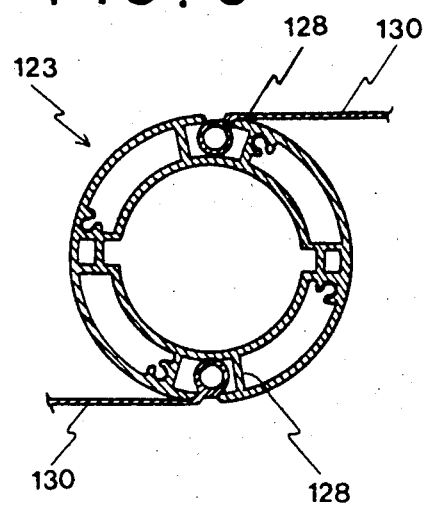

In the driving system of the present invention according to FIGS. 5–11, the flat belt 130 is made of steel and has a width to match the distance between flanges 127. There are four belts needed in the system, two each on each winding drum 123 at the ends of the shaft 122. One end of each of the belts 130 is fixed on an engaging member 13, and the other end of the belt is, as shown in FIG. 9, fixed in an engaging groove 128 formed in the periphery of the winding drum 123. In FIG. 9, it can be observed that a pair of belts 130 are attached to each drum 123 and fixed to the drum on opposite ends of a diameter of the drum. In this arrangement, as the drum draws in the belts 130, they are wound in alternate layers about the periphery of the drum. The pair of belts wound on the same winding drum 123 run through opposite guide rails 6, the furthest guide rail 6 receiving the belt through beams 7.

Referring back to FIG. 7, a coil spring 40 is shown wound around the shaft 122, and its construction and function are the same as that described in connection with FIG. 3.

Figure 10:
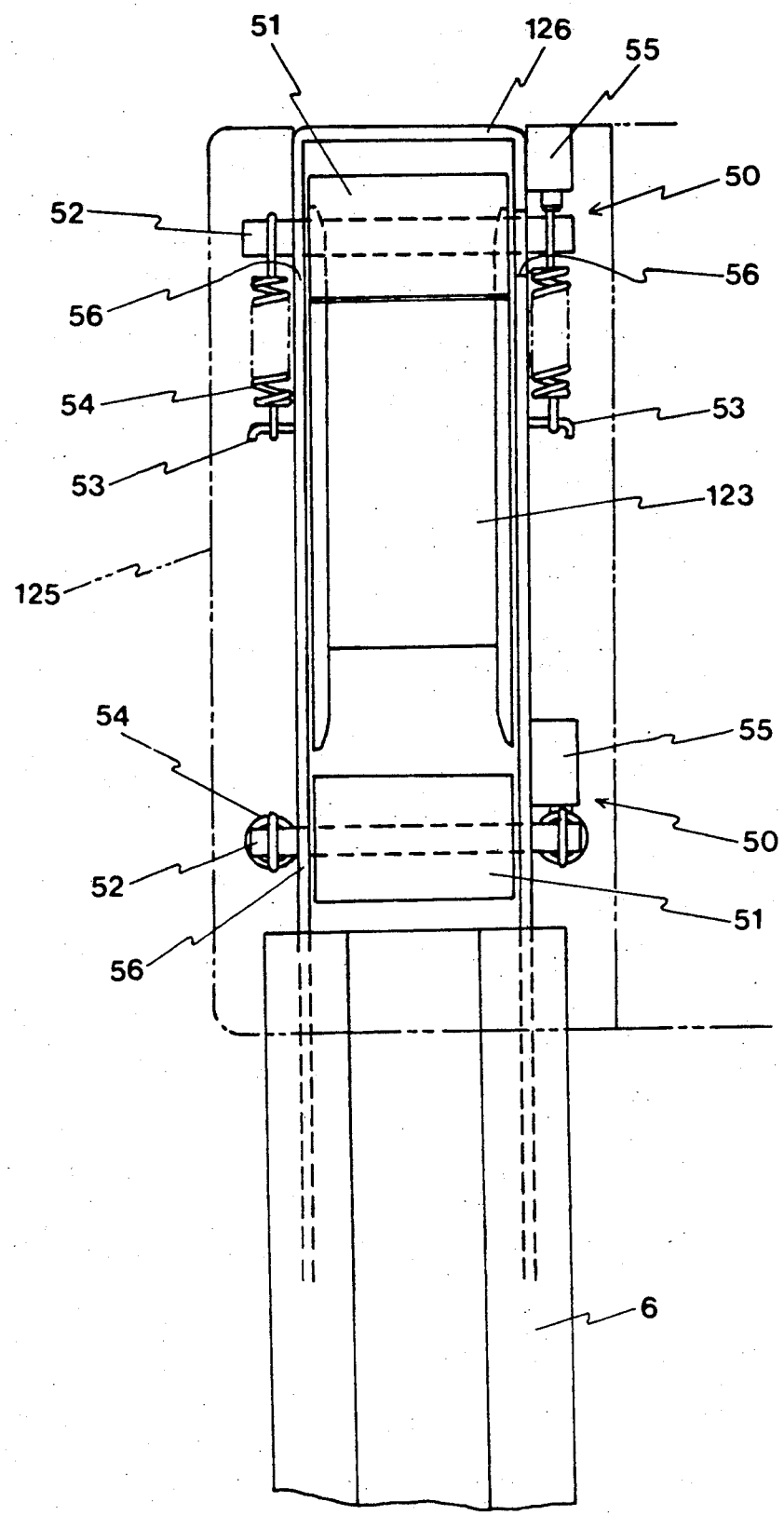
Figure 11:
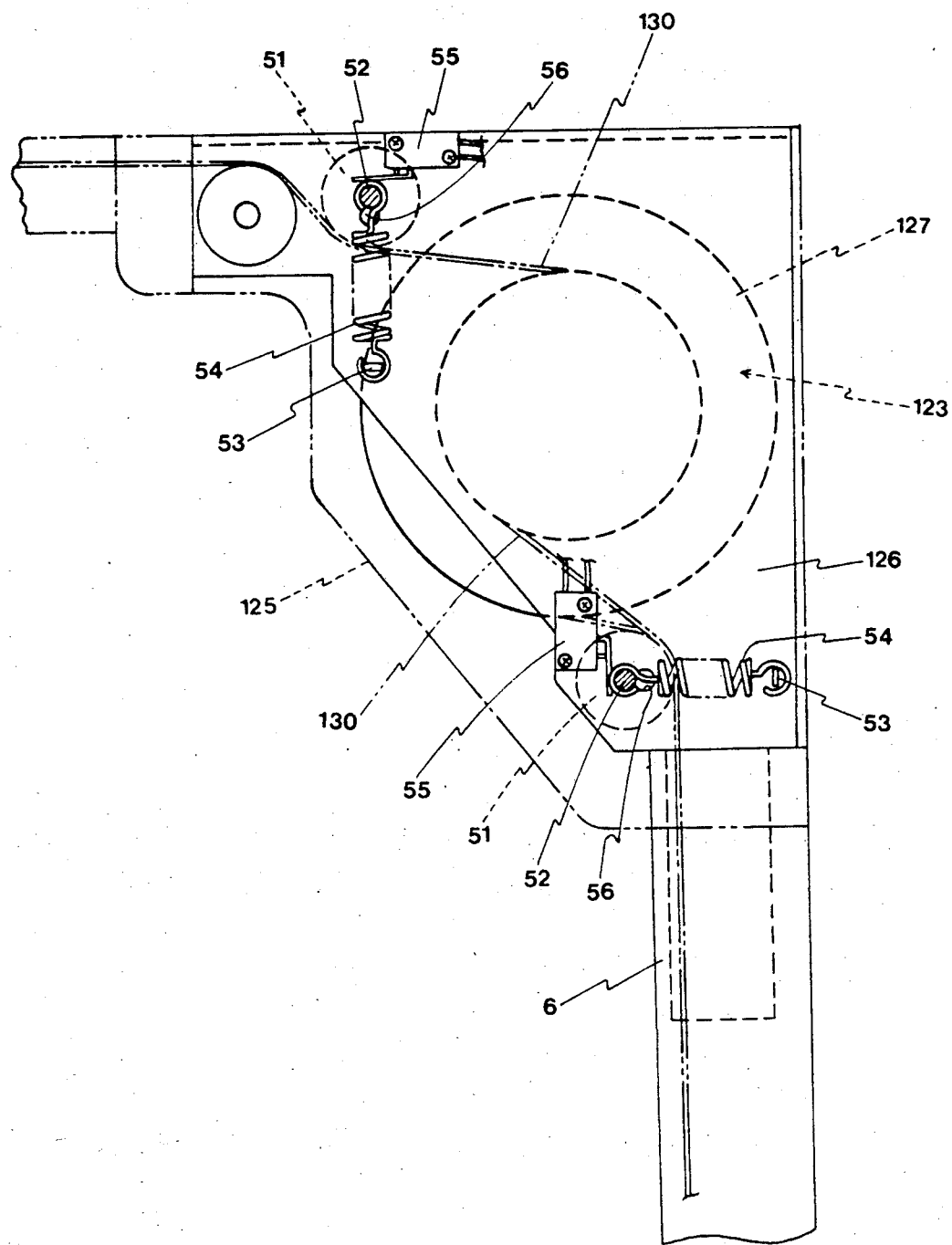

FIGS. 10 and 11 illustrate one of the safety devices according to the present invention. The safety feature illustrated is a tension detecting device 50 for detecting the loss of tension or breakage of belts 130. One such detecting device 50 is provided for each of the four belts 130 at the top of each column 6, and thus the four belts 130 act to hang the bed frame 10 from the detecting devices 50.

Each tension detecting device 50 is comprised of a cylindrical actuating roller 51 engaging belt 130 and supported by a shaft 52. Stay peg 53 is fixed on bracket 126 a distance from shaft 52. Tension spring 54 is supported between shaft 52 and peg 53, and a microswitch 55 contacting the shaft 52 is actuated on or off by the movement of shaft 52. Shaft 52 is supported in an enlarged hole 56 on bracket 126. It should be noted that the detecting device 50 is functional in the manner described whether the supporting cord body is a wire rope 30 or a belt 130. Means to prevent the bed frame 10 from falling, after the stopping of motor 121 by the actuation of microswitch 55, is disclosed elsewhere in this specification.

Figure 12:
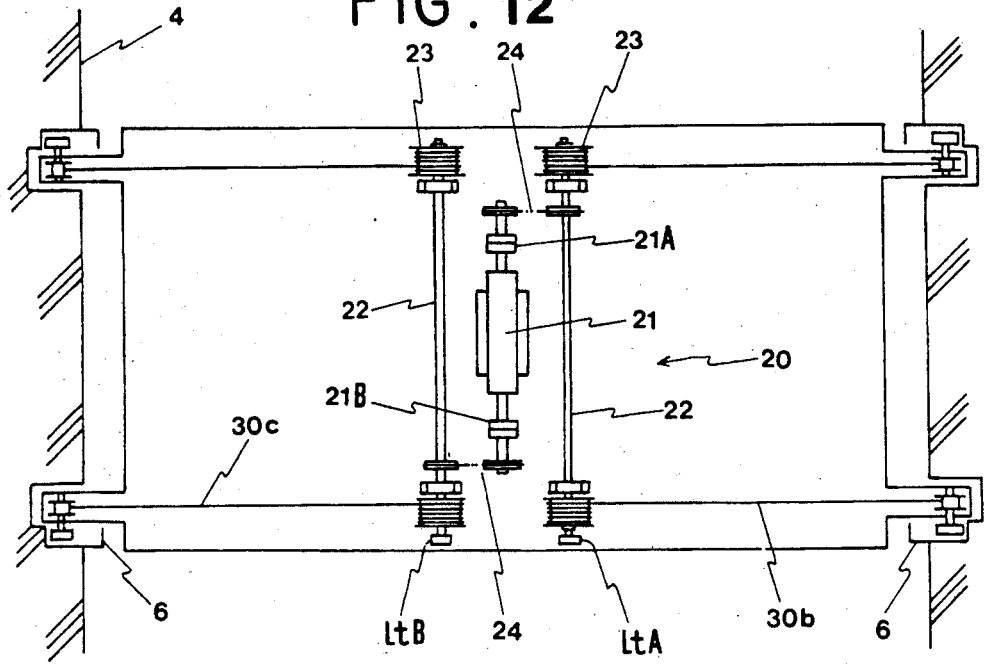
FIGS. 12-14 illustrate an inclining device for the bed frame, representing a third embodiment of the invention.

Next, another feature of the present invention will be explained with reference to FIGS. 12–14 according to a third embodiment of the invention. In this example, as shown in FIG. 12, a driving device 20 comprises two supporting shafts 22, each carrying two of the four winding drums 23, and two sets of endless belting means 24 for transmitting the power of the motor 21 to the supporting shafts 22. Accordingly, the wire ropes 30 wound on drums 23 are divided into two groups designated as 30b and 30c for the head side and foot side of the bed frame 10. Instead of driving the supporting shaft 22 directly with motor 21, electro-magnetic clutches 21A and 21B are provided in order that wire ropes 30b and 30c may be driven separately on each of the drums 23.

Figure 13:
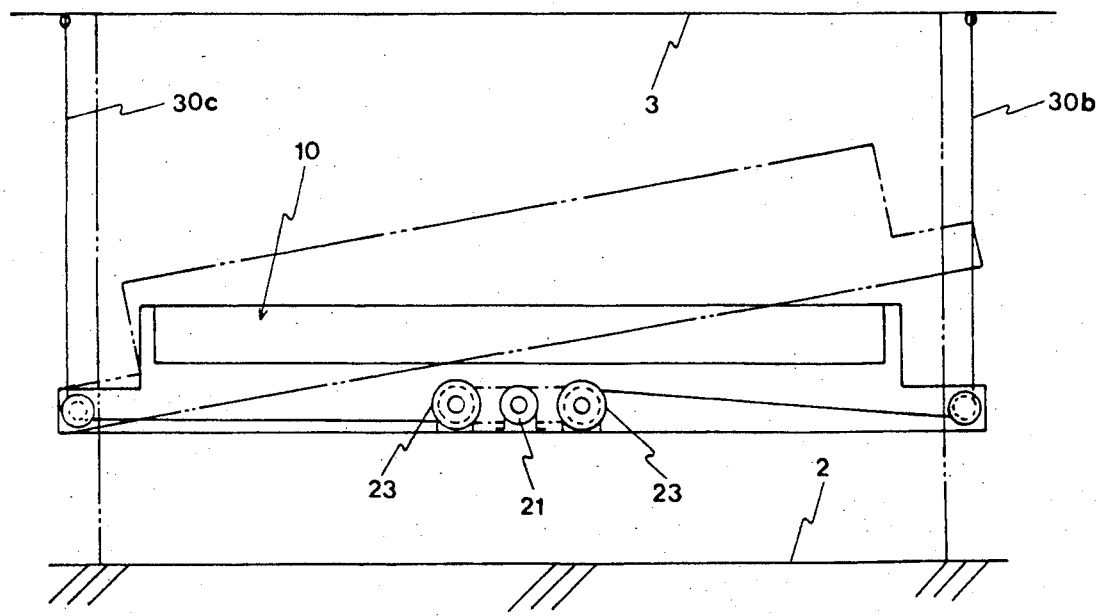

In this arrangement, when the driving device 20 begins its ascending operation with one clutch 21B off, for example, the bed frame 10 is raised only by wire rope 30b to achieve the inclined posture shown in imaginary lines in FIG. 13. Accordingly, the bed frame 10 has either its head side or its foot side higher than the other depending upon which electro-magnetic clutch is engaged at the time the bed frame 10 is ascending.

Figure 14:
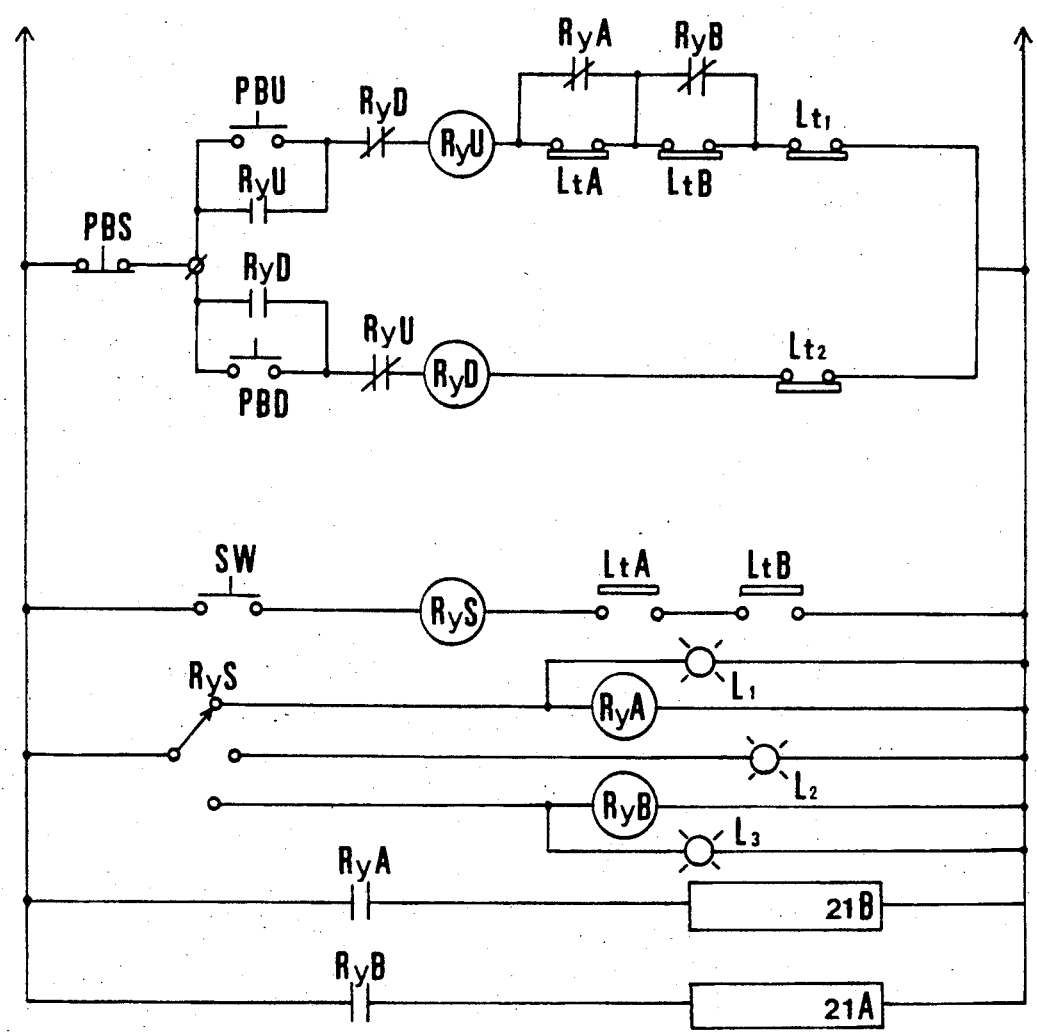

FIG. 14 is a circuit diagram of the electric power distribution for driving the elevation bed 1. In the drawing, PBU, PBD and PBS designate push buttons for up, down and stop modes of the bed frame, respectively. RyU and RyD designate relays for up and down movements of the bed frame (the circled relay designations are the coil windings of the relay, while the spaced parallel lines represent normally open contacts for that relay, and the crossed parallel lines indicate normally closed contacts for that relay). RyA and RyB are relays for electro-magnetic clutches 21B and 21A, respectively. A stepping relay RyS is energized each time the change-over switch SW is pressed, thereby stepping the arm of relay RyS through the three positions shown. Lamps $L_1$, $L_2$, and $L_3$ indicate posture modes for the bed frame 10 when the change-over switch SW selects either head side up, horizontal, or foot side up positions. Detecting sensors LtA and LtB are provided to limit the position of the head side and/or foot side action of clutches 21A and 21B, relative to each other. Since the difference in height between the head side and foot side is to be limited, the limit sensor LtA and LtB are attached to the ends of shafts 22 as seen in FIG. 13, and operation of sensors LtA & LtB will thus depend upon the amount of incline in either direction as determined by the phase relationships between clutches 21A and 21B. If it is desirable to permit sensors LtA and LtB to function only when the bed frame 10 is in the lower most position of its movement range, the limit switches can be of any known design which can sense the position of the bed frame relative to the floor level.

Accordingly, when the changeover switch SW is pushed to set the RyS contacts to the horizontal (center) position, the bed frame 10 moves in ordinary vertical motion by the push button operation of PBU or PBD, since neither relay RyA nor RyB is actuated, and therefore neither clutch 21B nor 21A is released. When the switch SW moves the RyS contacts to the "head side up" position (bottom position in FIG. 14), the corresponding foot side clutch 21A is energized to release its clutch engagement, and the winding drum 23 of the head side winds the wire rope 30b to position the bed frame in the inclined posture shown in FIG. 13.

Limit switches $Lt_1$ and $Lt_2$ limit the upward and downward movements of the bed frame 10 by opening the path to the relay coils for relays RyU and RyD, respectively. As described, switches LtA and LtB limit the movement of the inclining operation by releasing clutches 21B and 21A, respectively, and the bed frame stops at the limited inclined position. It is to be noted that both the upper and lower limit sensors $Lt_1$, $Lt_2$ and the inclined position limit sensors LtA, LtB function in the manner described even if the operator fails to push the stop button PBS. It is also to be noted that when either limit sensor LtA, LtB for the inclined limits is operated, the only function possible is to lower the incline back toward the horizontal position. For example, if the head side is being raised, switch RyS is in the upper position, and relay RyA is energized. This closes contacts RyA and releases clutch 21B. The other clutch, being engaged (not released), then couples the driver motor to the driving device to lift the head side of bed frame 10. If the operator continues to push the up push button PBU, eventually limit switch LtA will open, and since the contact RyA opens in the "up" control path, current ceases to flow through the "up" path, and the bed will stop. No further movement of the bed frame 10 can occur by the continued pushing of PBU push button. However, push button PBD does have a complete path through relay RyD, but since clutch 21B is released, only clutch 21A is activated, and consequently, the rotation of the motor will operate only the head side of the bed to return it to the horizontal position The clutching arrangement for the driving device according to the present invention can be applied to the embodiments of the elevation bed shown in FIGS. 2, 4 and 5, and their positions can be as indicated in dotted lines at location C in FIGS. 3 at 7. In FIG. 7, the placement of a second coil spring 40 is also shown in dotted lines, and this clutching arrangement is used with the aforedescribed embodiments of the invention.

Figure 20:
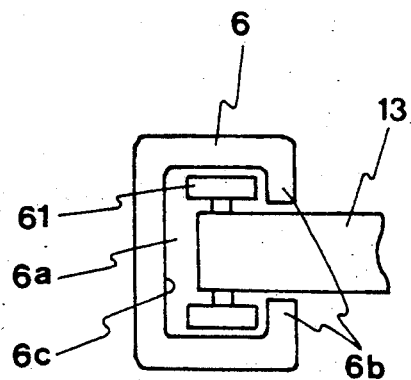

In the elevation bed described above, the bed frame 10 may require a safety device to protect against movement in the horizontal direction. To ensure safe movement of the bed frame 10 along the guide rails 6, each of the engaging members 13 must make good coupling engagement with the guide groove 6a of the guide rail 6. For this purpose, guide rail 6 of the prior art, as shown in FIG. 20, is made of a steel member having a C-shape cross section, and a roller 61 is provided to be captured within the guide rail 6 by flanges 6b formed on the mouth of the guide groove 6a. However, in assembling the elevation bed 1 of the prior art, the rollers 61 must be inserted at either end of guide rail 6, and with the application of large forces during the assembly process, deformation or damage of both the roller assembly 61 and flange 6b may occur, resulting in the disengagement of the engaging member 13 from the guide rail 6. This is even more of a problem in the embodiment of the invention where the bed frame 10 is inclined, since the distance between engaging members on the ends of the bed frame 10 is less than the distance between guide rails 6, and damage or disengagement tends to occur more easily.

Figure 15:
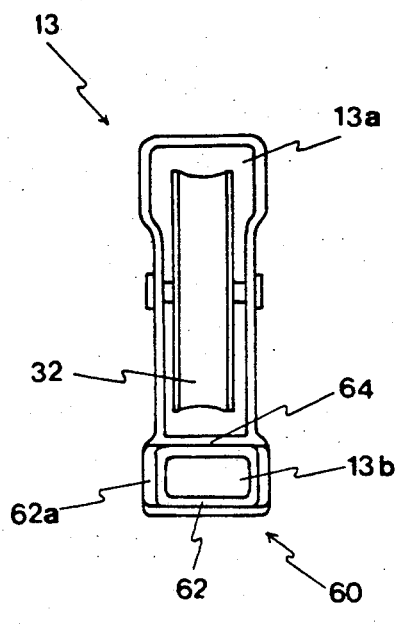
FIGS. 15-20 illustrate a safety device for preventing disengagement of engaging members from the guide rails.
Figure 16:
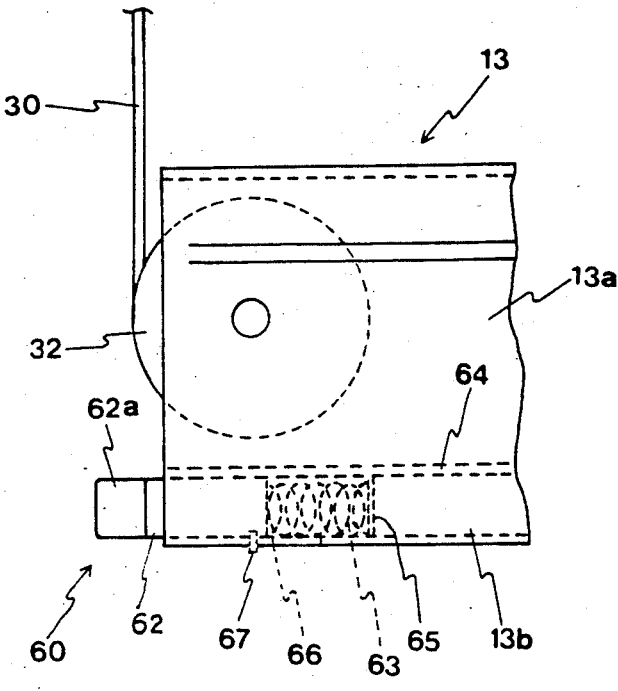

In the present invention, a plunger device 60 is yet a further safety feature provided in each of the engaging members 13. The plunger 60 will be explained with reference to FIGS. 15-18. The plunger device 60, as shown in FIGS. 15 and 16, consists of a plunger body 62 and a compression spring 63 to bias the plunger body 62 toward the guide groove 6a of the guide rail 6. In the plunger device 60, the distal end of the engaging member 13 is divided horizontally into two areas by a dividing plate 64 to define upper area 13a to contain sheave 32, and lower area 13b to house the plunger device 60. In the lower area 13b, an end plate 65 is fixed, and spring 63, together with plunger body 62, are installed in front of the plate 65, the free end of the plunger body 62 being protruded from the lower area 13b to contact, as shown in FIG. 17, the groove in 6c of the guide rail 6.

In the bottom wall of the lower area 13b, a longitudinal groove 66 is provided, and a limit pin 67 is provided on the plunger body 62 positioned to protrude into the groove 66, thereby defining a stroke path for the plunger body 62 which may be extended to its furthest position determined by the location of end plate 65 and the length of the spring 62.

Figure 17:
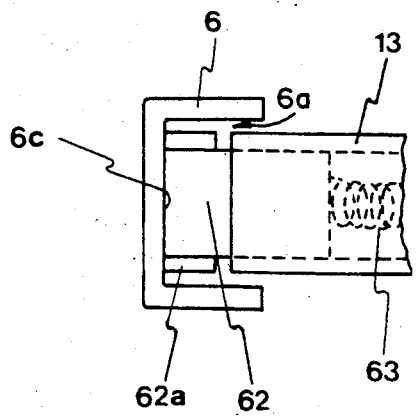
Figure 18:
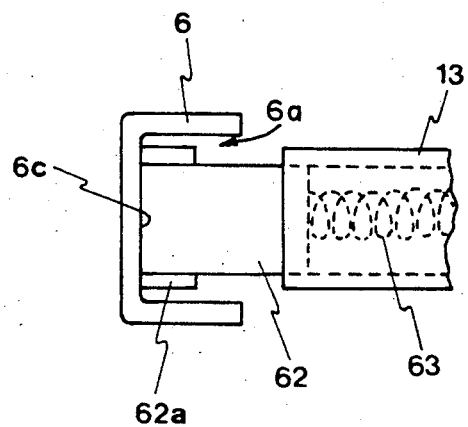

FIGS. 17 and 18 show two positions of the plunger body 62 as the engaging member 13 moves relative to guide rail 6 in an inclination mode of operation of the bed FIG. 17 shows the condition with the bed frame horizontal, for example, and FIG. 18 shows the spaced relationship between engaging member 13 and guide rail 6 in the inclined position. In the latter position, the plunger body 62 and spring 63 action have caused the plunger body to extend and maintain good contact with the groove end 6c. In these figures, supplemental members 62a are shown fixed on the side of the plunger body 62 to make the width of the plunger body 62 more closely match the width of the guide groove 6a, thereby providing the engaging member 13 with a smooth motion along the guide rail 6 without vibration or shaking. The shape of the guide rail 6 need not have flanges 6b as shown in FIG. 20.

Figure 19:
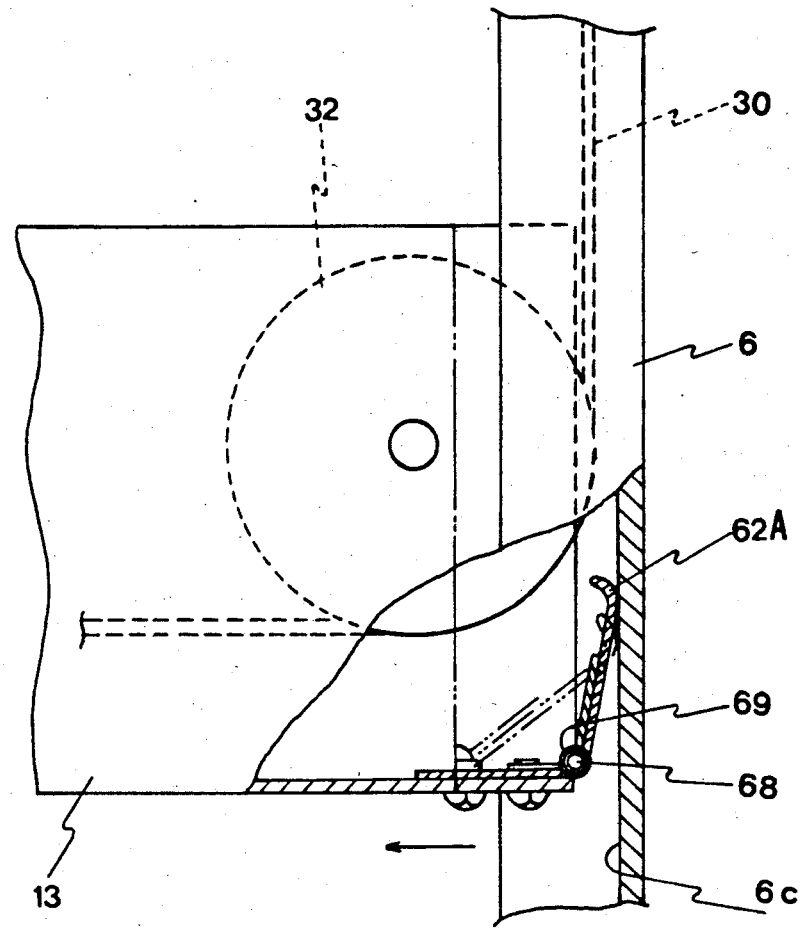

FIG. 19 shows another embodiment of a disengagement preventing device corresponding to plunger 60 of FIGS. 15-18. In this example, the disengagement preventing body 62A is a plate hinged on the bottom of the engaging member 13 by a shaft 68, and able to swing outwardly by action of the bias of a twisted coil spring 69 applied around the shaft 68. This second embodiment of the disengagement preventing device is capable of application to all of the previously described examples of the driving system for the elevation bed.

Figure 21:
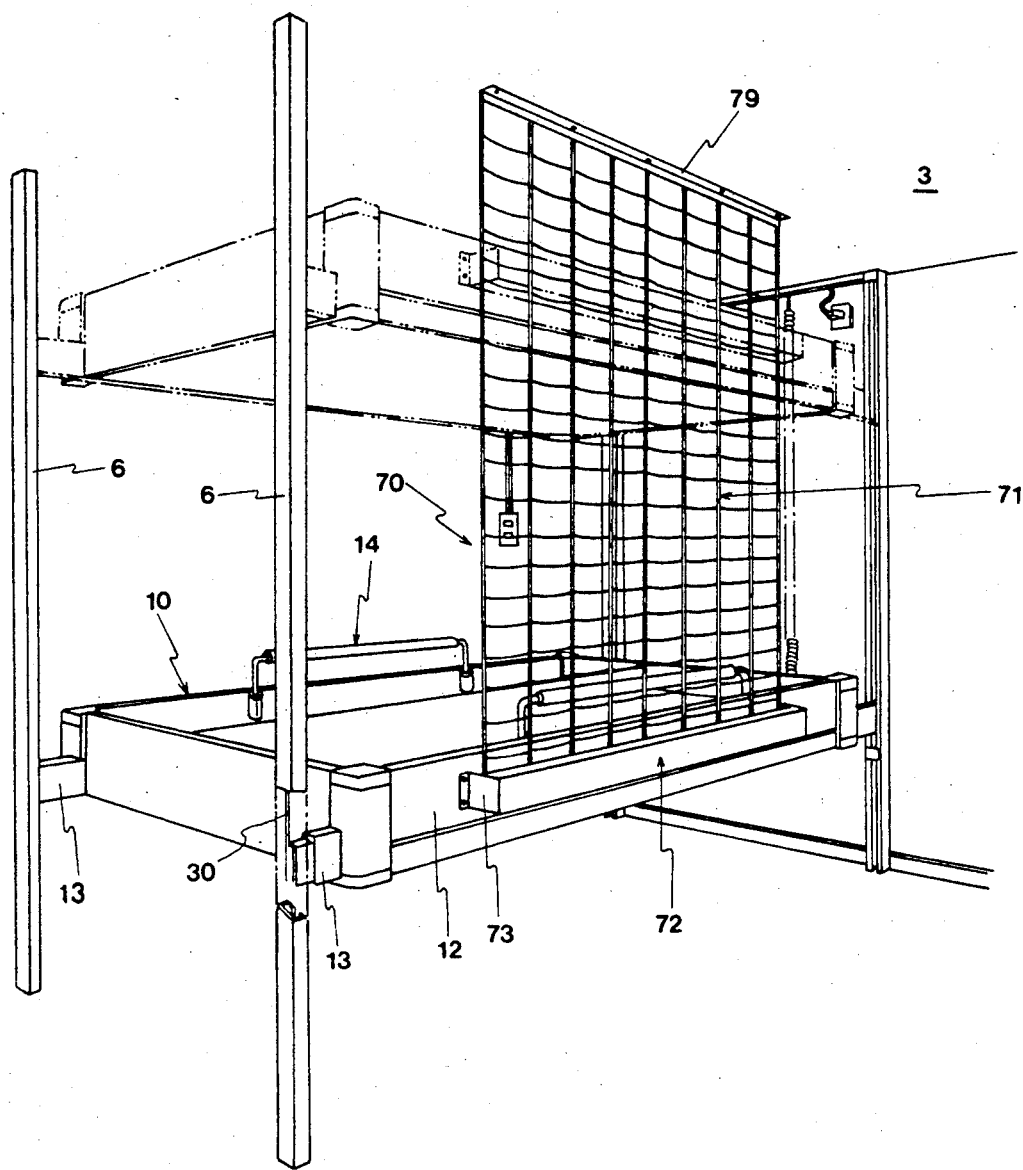
FIGS. 21-23 illustrate a protective device to prevent the user from falling out of bed.
Figure 22:
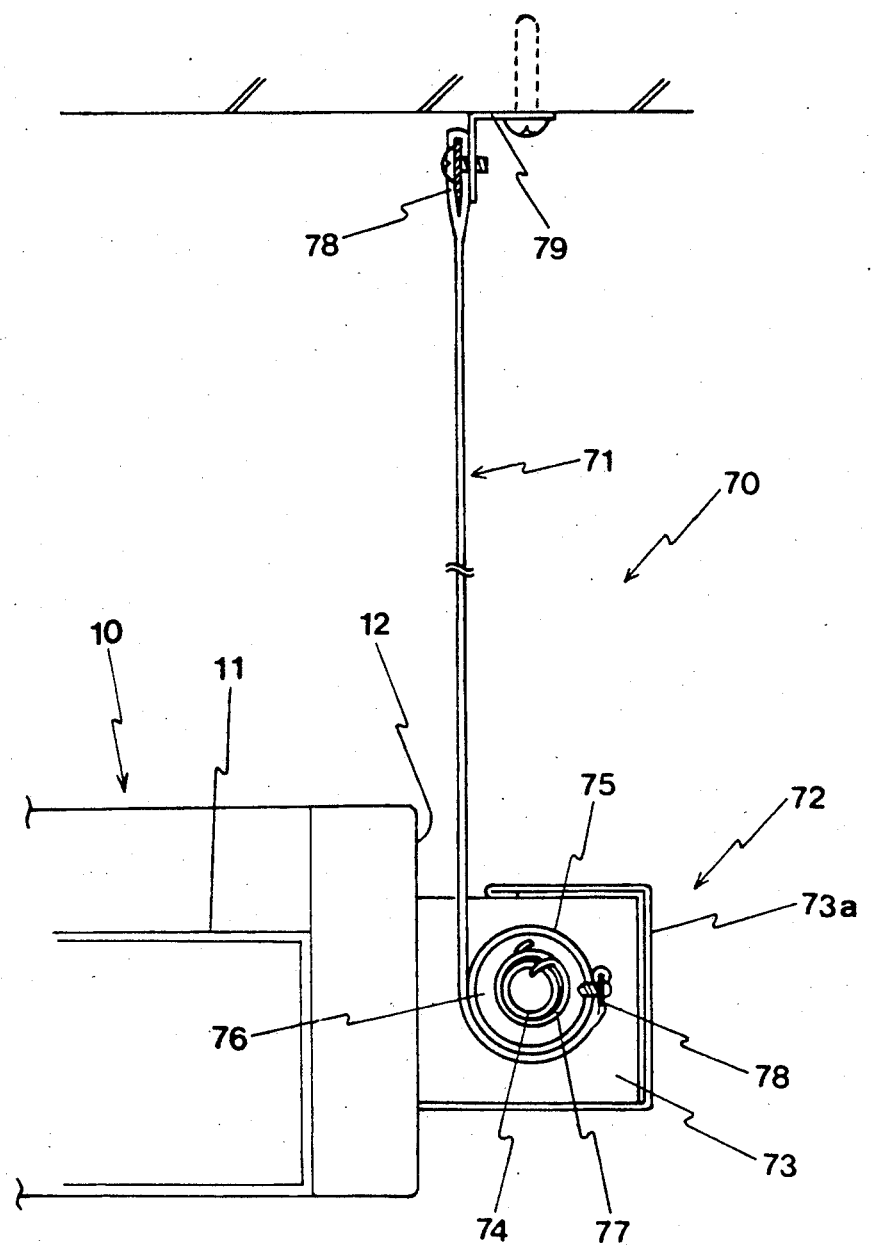
Figure 23:
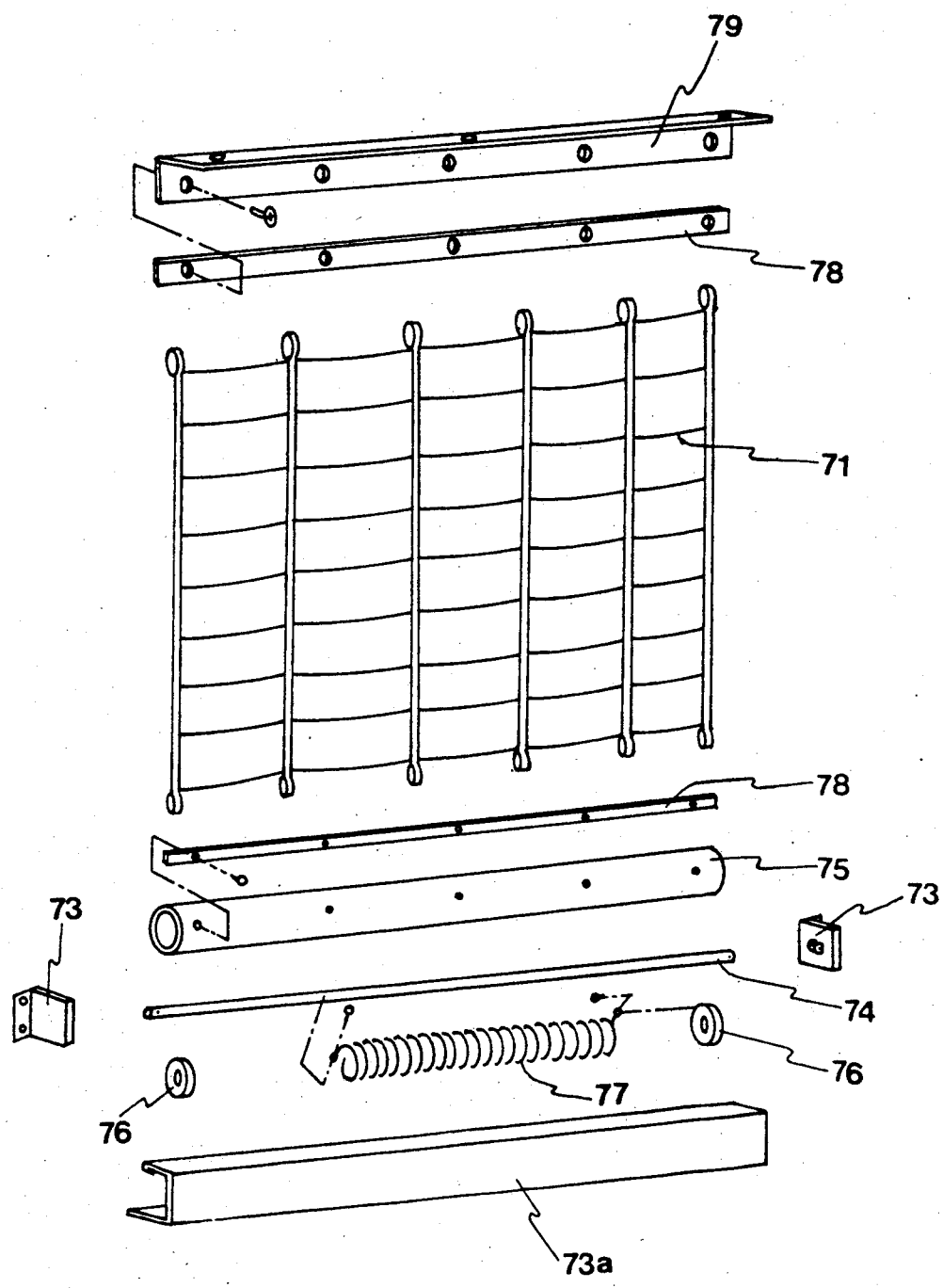

Next, according to the present invention, a guard structure 70 is another safety device provided along the bed frame 10 to prevent the user from falling out of bed. The guard structure protecting device 70 will be explained with reference to FIGS. 21-23. The guard structure 70 comprises a roll of guard netting 71 provided between at least one side of the bed frame 10 and ceiling 3. A winding device 72 for the guard netting 71 is installed along a length of the bed frame 10 leaving room for entrance at the head side or foot side of the bed. The winding device, as shown in FIGS. 22 and 23, comprises a pair of brackets 73 fixed on the side board 12 of the bed frame 10 to support the assembly. A supporting shaft 74 mounted between brackets 73 has a twisted coil spring 77 wound around it and fixed to the supporting shaft 74 on one end. The other end of the spring 77 is fixed to an end plate 76 of a tube body 75 rotatably supported about the shaft 74, and a cover casing 73a houses the entire assembly 72. The guard netting 71 is fixed to the ceiling 73 by means of a fixing member 79 and a first fixing bar 78, and to the winding device 72 by means of a second fixing bar 78, the upper fixing bar 78 attached to fixing member 79, and the lower fixing bar 78 attached to the cylindrical body 75 about which the guard net is rolled. This safety device is capable of application to all of the aforementioned examples of the driving system.

Next, according to the present invention, cushioning devices 80 (FIGS. 24-28) are described as a further safety feature provided for improvement in the safe and shock-free operation of the bed frame 10, both in the movement of the bed frame and action of the belts 30 at the start of the movement operation.

Figure 24:
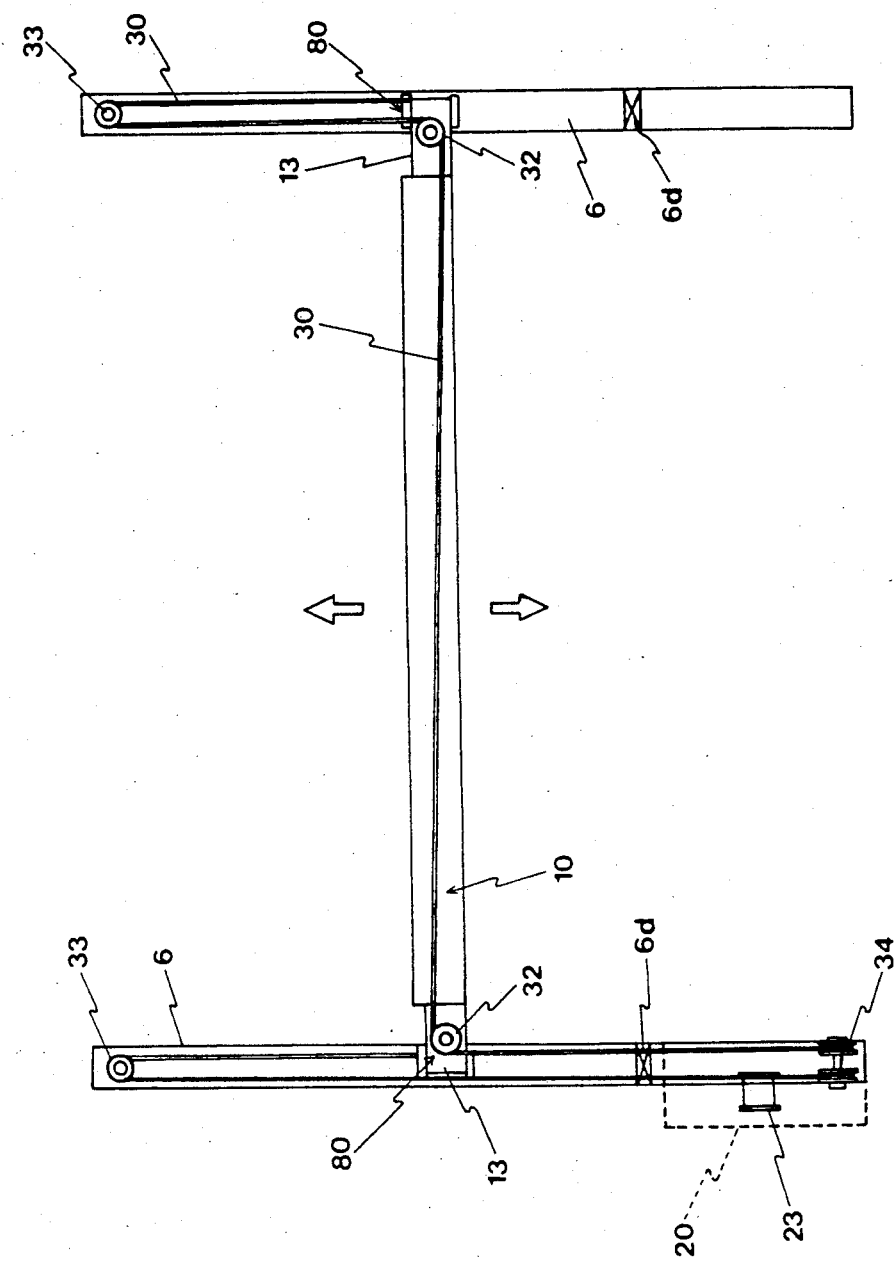

FIG. 24 shows a sectional view of an elevation bed comprising a pair of guide rails 6, a bed frame 10, engaging members 13, and wire ropes 30 arranged for up and down movement of the bed frame 10. A cushioning device 80 is installed at the far end of each of the engaging members 13. One of the wire ropes 30 is fixed to the right side cushioning device 80 on one end, then runs upwardly around a sheave 33 supported on top of the right guide rail 6, and via a sheave 32 in the right engaging member 13 through the frame member 11 of the bed frame, around a sheave 32 on the other side, turns upwardly from a sheave 34 at the bottom of the guide rail 6, and ultimately to be fixed on a winding drum 23 at its other end. Winding drum 23 is operated by driving device 20 disposed at the lower part of the guide rail 6. The other wire rope 30 has one end fixed on the left side cushioning device 80, runs to a top sheave 33 and down to a lower sheave 34, then turns upwardly to reach the same drum 23 in the same winding direction as the one described above, and vertical movement of the bed frame 10 achieved. The location of the driving device 20 is not limited to the position described. A stopper 6d is shown in the drawing of FIG. 24 to regulate the lower most limit of the bed frame 10.

The cushioning device 80 of the present invention consists, as shown in FIG. 25, of a cylindrical body 81, upper and lower end plates 82, a piston 83 movable in the cylinder 81 and attached to the end of wire rope 30, and a compression coil spring 84. The spring 84 is inserted around wire rope 30 between the upper end of the plate 82 and the piston 83. When the bed frame 10 rests on the stopper 6d (FIG. 24), and the bed is not in use, the spring 84 attains its most elongated state or natural length. The piston 83 touches the lower end 82 when the wire rope 30 is not tensioned.

The location of the parts described in connection with FIG. 24 are not critical, since all that is necessary is that spring 84 in the cushioning device 80 has a cushioning function during the start of the motion of the bed frame 10. Additionally, the position of driving device 20 is not limited to where it is shown in FIG. 24.

Figure 27:
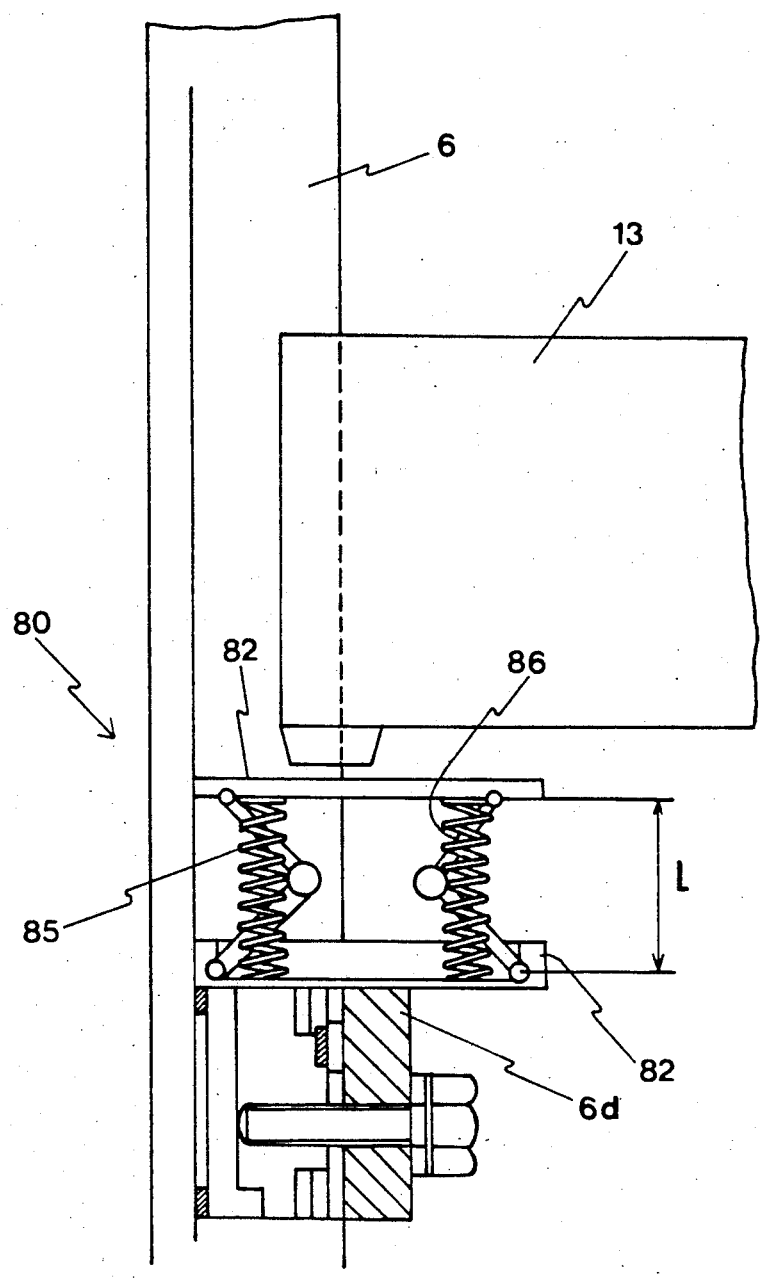

Another embodiment of the cushioning device 80 is shown in FIG. 27. Here, the device is disposed on the stopper 6d instead of at the end of the engaging member 13. In this example of the device 80, the compression spring 85, as well as a pair of folded links 86 are fixed directly between the upper and lower end plates 82. The operation of the bed frame 10 is the same as described above. Spring 85 has a stroke L, and the biasing force of the compression spring in its compressed state (bed frame 10 lowered) is chosen to enable a smooth start of the motion of the bed frame 10. A reduction of the torque for the driving motor is also obtained.

Figure 28:
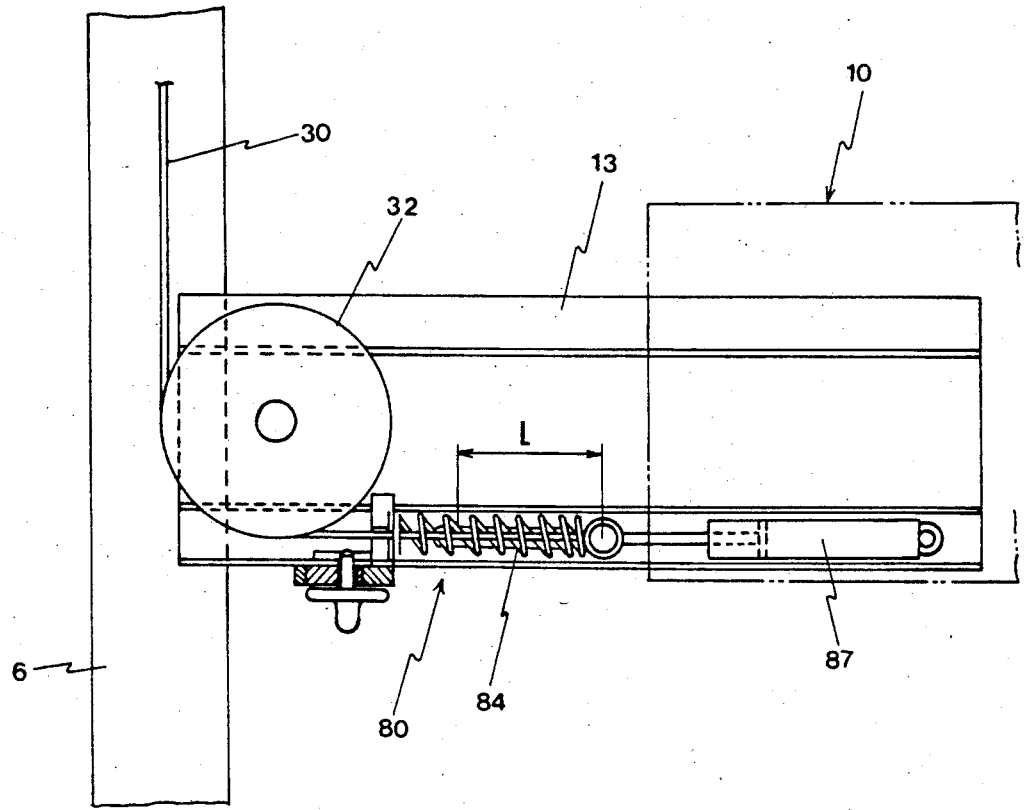

In FIG. 28, yet a further embodiment of the cushioning device 80 is shown. In this example, the device can exhibit a sufficient stroke L to operate in a longitudinal direction of the engaging member 13 by a horizontal arrangement of the device 80. A pneumatic damper 87 is added to increase the cushioning action and to reduce the lode of the motor 21. This safety device is also applicable to all of the aforementioned driving devices.

In addition to the various safety devices described above, in the design of the bed frame itself, safety features were considered. In the prior art, generally, side boards 12 are made of wooden panels simply fixed to frame members 11 by means of a screw. However, wooden panels are not only expensive and unsuitable for general purposes, they are also quite heavy.

Figure 30:
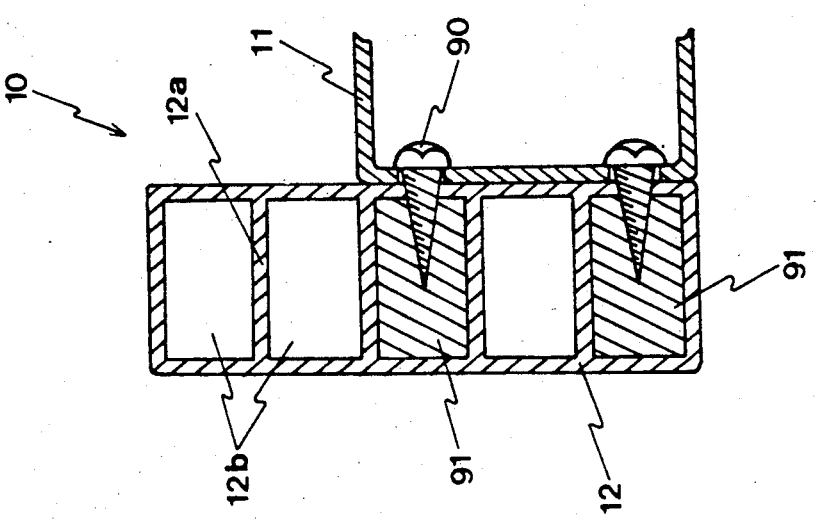
FIG. 30 is a sectional view of a side frame board fixed to a bed frame according to the prior art.

It is conceivable to make the side board hollow and of plastic. However, in the construction of the bed, when fixing the side board 12 to the member 11 by screws, the strength of the board itself is insufficient to support the weight of the user. Alternatively, as shown in FIG. 30, backing members 92 have been used in the prior art to secure the effective fixing of screws 9. The disadvantage of this assembly is that it is necessary to match the screw hole 93, provided in the back-up member 92, and the screw hole 94 in the frame member 11. This requires high accuracy for the positioning of both of the holes and renders the assembly work of the bed frame using screws in situ practically impossible.

Figure 29:
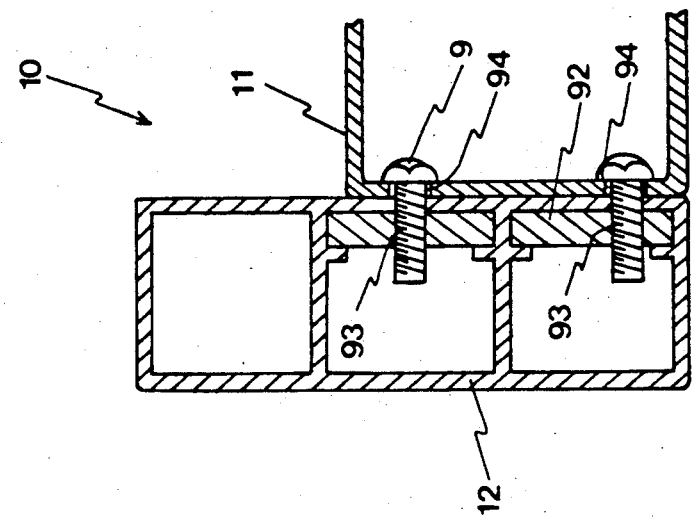
FIG. 29 is a sectional view of a side frame board fixed to a bed frame.

The construction of the side board according to the present invention is shown in FIG. 29. Side board 12 is molded and made of hard plastic, for example, vinyl chloride. By forming partition walls 12a, a plurality of hollow compartments 12b are formed in vertical symmetry. Core members 91, made of wood, fill the hollow compartments 12b. This construction allows the use of wood screws 90 and makes the assembly work simple and easy. Although the side board is made of plastic, the fixing of the side board 12 to the bed frame 10 results in a rigid and strong construction.

OPERATION

In the construction of the present invention described above, spring 40 can be provided about the supporting shaft 22 in the driving device 20 independent of the location of the driving device 20 and of the differences between the supporting shaft 22 and the supporting shaft 122, as described. When the drums 23 rotate in a direction to unwind the wire ropes 30, as the bed frame 10 descends, the spring 40 is twisted to store a biasing force. Thus, the load on the motor is reduced when the drums 23 wind the wire ropes to raise the bed frame. This gives the driving device 20 of the present invention an advantage not found in the prior art.

In the present invention, the casing 25 is installed in a beam supported along a wall 4, and accordingly, the weight of the driving device 20 in the casing can be carried by the wall. Thus, compared with the example where the driving device is carried in the bed frame 10 and where the driving device 20 is carried on an independent beam 7, the present invention permits the motor to have a reduced load, and the structure 5 itself can be made of lighter construction material. With the smaller volume of the casing 25 or 125, the overhead space above the bed frame 10 is more effectively utilized. In the embodiment of FIG. 5, the casing 125 is, as in the preceding example, supported on the beam 7 along a wall 4. Moreover, the driving device 120 is designed such that the motor 121 is supported within the rotatable shaft body 122. This eliminates the endless belt members of the other arrangements, and the casing 125 can be made smaller and more compact.

In the embodiment of FIGS. 5-11, when the motor is operated to wind the belts 130 on winding drum 123, by the winding revolutions of drum 123, two belts 130 are simultaneously wound on the drum 123 in alternating layers, causing the bed frame 10 to ascend. By unwinding of the belts 130, the bed frame 10 descends. Accordingly, the disadvantage of wire ropes 30 folding and being damaged, and in the worst case broken, is avoided.

The speed and torque of the up and down motion of the bed frame is advantageously automatically regulated by the present invention. Suppose, for example, that the vertical range of movement of the bed frame 10 is 1,900 mm, the thickness of the belt 130 is 1.2 mm, and the outer diameter of the winding drum 123 is 70 mm, then the following equation applies:

$$2\pi (35+36.2+37.4+ \ldots +48.2+49.4+50.6) = 1,900 \times 2,$$

wherein the numbers inside the parentheses are the radii of the individual layers of belt. The number of layers needed to equal the length of the belt being wound is 14 layers. The simple mathematical formula for finding the circumference of a circle, i.e., $C = \pi D$ is used on the left side of the equation, and the total length of the belt wound on the drum, being 1,900 mm for each belt 130, or 3,800 mm for both belts, is set forth in the right side of the equation. The first number within parentheses is the radius of the smallest diameter of the wound belts, while the last number is the maximum radius of the wound belts, resulting in the fact that the diameter of 70 mm at the start of the ascension of the bed frame 10 becomes about 101 (50.6×2) mm at the end of the ascension of the bed, due to the winding of the belt in layers on the drum 123. The result is that the speed and torque of the up and down motion is changed by a ratio of about 1:1.44 (70:101). In other words, in the up and down movement of the bed frame 10, the descending speed becomes slower as the bed frame 10 approaches its lower limit, and this is beneficial so that the user has more time to confirm the existence of obstacles as the bed frame gets closer to the floor, thereby increasing the safety of the bed system. The driving torque for the up and down movement also changes. Since the toque is maximum at the start of winding where a large torque is required, it is possible to prevent the motor 121 from becoming overloaded and to obtain smooth operation of the elevation bed for the entire range of movement. Moreover, the torque becomes minimum at the end of the winding process, and any pressure the user of the bed may suffer by being pressed against the ceiling 3 is relatively small, and thus another safety feature of the invention is realized.

Next, the operation of the schematic of FIG. 14 will be given. First, daily normal horizontal operation will be explained. In FIG. 14, the step relay RyS is set "on" by pushing push button SW. This steps the relay from one position to another continuously. Assuming that the second position in FIG. 14 is obtained, indicator lamp $L_2$ lights indicating that the bed frame 10 is in the normal horizontal mode of operation. Then, by operation of push button PBU or PBD, and with both of electromagnetic clutches 21A and 21B engaged with motor 21 and supporting shaft 22, all of the winding drums 23 naturally wind and unwind wire ropes 30 simultaneously and in equal length, to raise or lower the bed frame 10. Since neither head nor foot side differences of level exist in the bed frame 10, both of the detecting sensors LtA and LtB are inoperative, but when the bed frame 10 is at the upper or lower limit near the ceiling 3 or floor 2, limit switches $Lt_1$ or $Lt_2$ may act to cut the power to stop the bed frame 10.

Next, in order to incline the bed frame 10 from a horizontal position to a position with the head side higher, as shown in FIG. 13, change over switch SW is pushed until indicator lamp $L_1$ lights up indicating that the "head-up" position has been selected and the relay RyA is energized, thereby releasing electromagnetic clutch 21B. With the clutch 21A active and clutch 21B released, the winding drum 23 winds wire rope 30b only, raising the head side of the bed frame 10 to the desired inclination. Eventually, the phase detecting sensor LtA automatically activates, breaking the connection with the push button PBU and thus cutting the circuit of the motor to halt the bed frame 10 in the desired position.

To return to a horizontal position of the bed frame 10 from the head-up state, with the change-over switch SW as it is, actuation of push button PBD energizes clutch 21A only, and the drum 23 unwinds the wire rope 30b to lower the end of the bed frame 10. The limit switch $Lt_2$ operates to cut the motor circuit to halt the bed frame 10 from descending further. The operation of the bed raising the foot side of the bed frame 10 and subsequently recovering to the horizontal position may be understood in the same way as described above.

As to the described safety devices in accordance with the invention, in the first safety device of FIG. 11, if any loss of tension or a break in the belts 130 occurs, the tension detecting device 50 operates so as to move the pulley 51 to release the tension bias of spring 54 causing it to contract. At the same time, by the movement of the shaft 52 in the enlarged hole 56, microswitch 55 cuts the power to motor 121. The operation is independent of the type of cord used, wire rope 30 or belt 130.

In the second safety feature, the operation of the disengagement preventing device 60 is as follows. Even when, by an occasional horizontal movement relative to the guide rail 6 or by the inclination of the bed frame 10, the relative distance between the guide rails 6 and the engaging means 13 changes as shown in FIGS. 17 and 18, the disengagement preventing body 62 provided in the engaging member 13, being biased by spring 63, keeps the engaging member in contact with guide rails 6 at all times.

In the third safety device of the invention, the operation of the guard structure protecting device is as follows: The guard netting 71 is hung from the ceiling 3. By biasing the spring 77, the guard netting 71 is always conditioned to be wound onto the roller 75. Whenever the height of the bed frame 10 changes to any position within its up and down range, the net automatically adjusts to the proper length. Moreover, the strength of the spring 77 is strong enough to keep the netting 71 taught even under the condition where it must support the weight of an ordinary user. The device 70, as a means for preventing a user from falling out of bed, gives the user a feeling of safety, as does the hand rail 14.

In the fourth safety device of the invention, the operation of the cushion device 80 is as follows: At the start of ascending of the bed frame 10, the wire rope 30 is drawn and the piston 83 is lifted. The spring 84 is gradually compressed and the piston 83 raises by its stroke L to shorten the spring 84 to a set length. The stored energy of the spring 84 thus assists in raising the bed frame 10 to achieve a balance between the driving force and the weight of the bed 1.

In FIG. 26, a graph of the torque of the motor 121 versus time is shown. As described previously, the driving wire rope 30 is not fixed directly to the engaging member 13 of the bed frame 10, but rather is connected to compression spring 84 of the device 80. Thus, as the bed frame 10 starts to ascend, a time lag during the rising of the piston 83 is obtained. Moreover, with the biasing of the spring 84, any sudden load imposed on the motor 121 or any resulting shock on the bed frame 10 can be avoided. Additionally, it is possible to employ a smaller sized motor resulting in a driving device that is lighter and more compact.

In fixing the frame board to the frame members 11, a hollow type frame board 12 is used. By filing the hollow regions with a core material 91 as back-up members, the need for precise screw holes on both members 11 and 12 is non-existent, since wood screws 90 can be used to fasten the two structures.

INDUSTRIAL APPLICABILITY

The elevation bed according to the present invention presents a novel improvement of the fundamental construction of the driving device for elevation beds movable between a lowered position near the floor when in use and a raised stored position near the ceiling to make use of the space under the bed when not in use. The addition of a spring means with a biasing force to assist the driving device makes it possible to have a smaller driving device assembly. This results in greater utilization of room space and overall beauty. Secondly, the cords used to hang the bed frame and drive it up and down are made of a belt construction and wound on winding drums on layers. This not only allows the driving device to be smaller, but the speed and motion of the bed frame is safer.

The third and most important improvement lies in the driving device of the present invention having the ability to position the bed at various degrees of inclination. This has various advantages.

Various safety devices related to the driving devices described add safety to the movement of such large furniture components. The elevation bed described contributes to the enjoyment of modern living, especially when used in a small room.

We claim:

1. In an electrically driven elevation bed including:
   a structural support frame (6,7);
   a bed frame (10) movable in up and down directions within said support frame (6,7); and
   means (21,23,30,31) for moving said bed frame (10) within said support frame (6,7), including an electrical driving means (21), the improvement comprising:
   a spring arrangement (40) coupled to said driving means (21) for storing energy during movement of said bed frame (10) in one of said directions and to release the stored energy during movement of said bed frame (10) in the other direction.

2. The improvement as claimed in claim 1, wherein said electrical driving means is a motor (21, 121) and said means (21,23,30,31) for moving said bed frame (10) further includes:
   a drum (23,123) coupled to and driven by said motor; and
   at least one cord (30,130) wound on said drum and having a movable end coupled to said bed frame (10).

3. The improvement as claimed in claim 2, wherein said drum comprises:
   a central cylindrical hub; and
   a pair of flanges (127) on either end of said hub; and wherein said cord (30,130) is a flat steel belt sized to fit between said flanges so as to wind in layers around said hub.

4. The improvement as claimed in claim 3, wherein:
a pair of said belt-shaped cords (30,130) are provided; and
one end of each belt is connected on diametrically opposed positions on said drum hub, thereby effecting winding and unwinding both of said belts simultaneously and in alternate layers around said drum hub.

5. The improvement as claimed in claim 2, wherein said driving means (21) includes a pair of said drums (23) for winding separate ones of said cords (30b, 30c), one on each drum, said cords being coupled to the head side and foot side, respectively, of said bed frame (10), and wherein said driving means comprises at least one clutch means (21A, 21B) coupled between said motor and said drums, said clutch means adapted to engage and disengage transmission of driving power, which, in the disengaged state of said at least one clutch means, gives said bed frame (10) an inclined posture when said driving means is operated to raise said bed frame (10).

6. The improvement as claimed in claim 1, wherein said driving means comprises a motor (21, 121) and wherein said means (21, 23, 30, 31) for moving said bed frame (10) includes:
a shaft (22,122) coupled to and rotatably driven by said motor (21, 121);
a rotatable drum (23,123) driven by said shaft (22,122) and selectably rotatable in either direction; and
at least one cord (30, 130) having one end connected to said frame (10), and the other end wrapped around said drum (23,123), said cord end connected to said bed frame (10) moving axially of said cord as said drum rotates to effect up and down movement of said bed frame (10) within said support frame (6,7).

7. The improvement as claimed in claim 6, wherein said motor and said drum are mounted coaxially with said shaft.

8. The improvement as claimed in claim 7, wherein said drum (23,123) is hollow cylindrical in shape, and said motor is mounted within said hollow drum.

9. The improvement as claimed in claim 6, wherein said spring arrangement (40) comprises a coil spring wound around a portion of said shaft, said spring having one end fixed and the other coupled to said shaft, thereby tensioning said spring when said shaft rotates in one direction and relaxing said spring when said shaft rotates in the other direction.

10. The improvement as claimed in claim 6, including a tension detecting device (51-56) for sensing insufficient tension or the loss of tension in said cord.

11. In an electrically driven elevation bed including:
a structural support frame (6,7);
a bed frame (10) movable in up and down directions within said support frame (6,7); and
means (21,23,30,31) for moving said bed frame (10) within said support frame (6,7), including an electrical driving means (21),
a drum (23,123) coupled to and driven by said driving means (21); and
at least one cord (30,130) wound on said drum and having a movable end coupled to said bed frame (10); the improvement comprising
a spring arrangement (40) coupled to said driving means (21) for storing energy during movement of said bed frame (10) in one of said directions and to release the stored energy during movement of said bed frame (10) in the other direction; and
wherein said drum comprises a central cylindrical hub and a pair of flanges (127) on either end of said hub, and said cord (30,130) is a flat steel belt sized to fit between said flanges so as to wind in layers around said hub.

12. In an electrically driven elevation bed including;
a structural support frame (6,7);
a bed frame (10) movable in up and down directions within said support frame (6,7); and
means (21,23,30,31) for moving said bed frame (10) within said support frame (6,7), including an electrical driving means (21);
a drum (23,123) coupled to and driven by said driving means (21); and
at least one cord (30,130) wound on said drum and having a movable end coupled to said bed frame (10);
the improvement wherein:
said drum comprises a central cylindrical hub and a pair of flanges (127) on either end of said hub; and
wherein said at least one cord (30,130) comprises a pair of flat steel belts each sized to fit between said flanges so as to wind in layers around said hub, one end of each belt being connected on diametrically opposed positions on said drum hub, thereby effecting winding and unwinding both of said belts simultaneously and in alternate layers around said drum hub.

* * * * *